US012330952B2

(12) United States Patent
Konnai

(10) Patent No.: US 12,330,952 B2
(45) Date of Patent: *Jun. 17, 2025

(54) METAHALLOYSITE POWDER AND PRODUCTION METHOD THEREFOR

(71) Applicant: JFE MINERAL COMPANY, LTD., Tokyo (JP)

(72) Inventor: Hidefumi Konnai, Tokyo (JP)

(73) Assignee: JFE MINERAL COMPANY, LTD., Tokyo (JP)

( * ) Notice: Subject to any disclaimer, the term of this patent is extended or adjusted under 35 U.S.C. 154(b) by 704 days.

This patent is subject to a terminal disclaimer.

(21) Appl. No.: 17/049,438

(22) PCT Filed: Apr. 24, 2019

(86) PCT No.: PCT/JP2019/017471
§ 371 (c)(1),
(2) Date: Oct. 21, 2020

(87) PCT Pub. No.: WO2019/208646
PCT Pub. Date: Oct. 31, 2019

(65) Prior Publication Data
US 2021/0246039 A1     Aug. 12, 2021

(30) Foreign Application Priority Data
Apr. 25, 2018   (JP) .................. 2018-084240

(51) Int. Cl.
*C01B 33/40*     (2006.01)
*B82Y 40/00*     (2011.01)

(52) U.S. Cl.
CPC .............. *C01B 33/40* (2013.01); *B82Y 40/00* (2013.01); *C01P 2004/03* (2013.01);
(Continued)

(58) Field of Classification Search
CPC ......... C01B 33/40; C01B 33/26; B82Y 40/00; C01P 2004/03; C01P 2004/13;
(Continued)

(56) References Cited

U.S. PATENT DOCUMENTS

| 11,180,375 B2 | 11/2021 | Konnai et al. |
| 2006/0102871 A1 | 5/2006 | Wang et al. |

(Continued)

FOREIGN PATENT DOCUMENTS

| CN | 1746216 A | 3/2006 |
| CN | 101284670 A | 10/2008 |

(Continued)

OTHER PUBLICATIONS

Yuan et al (Changes in Structure, Morphology, Porosity, and Surface Activity of Mesoporous Halloysite Nanotubes Under Heating, Clays and Clay Minerals, 2012), (Year: 2012).*

(Continued)

*Primary Examiner* — Sally A Merkling
*Assistant Examiner* — Logan Edward Laclair
(74) *Attorney, Agent, or Firm* — Buchanan Ingersoll & Rooney PC

(57) ABSTRACT

The present invention provides a novel material using a meta-halloysite that does not exist in prior art, and a production method therefor. The meta-halloysite powder of the present invention is characterized in that: the meta-halloysite is covered by elemental carbon; the meta-halloysite contains elemental carbon; the meta-halloysite powder is a powder containing granules formed by the aggregation of meta-halloysite comprising meta-halloysite nanotubes covered by elemental carbon; or the meta-halloysite powder is powder containing granules formed by the aggregation of meta-
(Continued)

halloysite comprising meta-halloysite nanotubes, which are tubular meta-halloysite, wherein the meta-halloysite contains elemental carbon.

7 Claims, 13 Drawing Sheets

(52) U.S. Cl.
CPC ...... *C01P 2004/13* (2013.01); *C01P 2004/61* (2013.01); *C01P 2004/62* (2013.01); *C01P 2006/12* (2013.01); *C01P 2006/14* (2013.01); *C01P 2006/16* (2013.01)

(58) Field of Classification Search
CPC .............. C01P 2004/61; C01P 2004/62; C01P 2006/12; C01P 2006/14; C01P 2006/16; C01P 2002/72; C01P 2004/04; C01P 2004/50; C01P 2006/17; C01P 2006/21
See application file for complete search history.

(56) References Cited

U.S. PATENT DOCUMENTS

| | | | |
|---|---|---|---|
| 2007/0202061 A1 | 8/2007 | Riedlinger et al. | |
| 2007/0292459 A1 | 12/2007 | Cooper et al. | |
| 2009/0092836 A1 | 4/2009 | Geckeler et al. | |
| 2012/0107214 A1 | 5/2012 | Suh et al. | |
| 2018/0305543 A1 | 10/2018 | Agrawal et al. | |
| 2020/0062603 A1 | 2/2020 | Konnal et al. | |
| 2020/0123025 A1 | 4/2020 | El-Masri et al. | |

FOREIGN PATENT DOCUMENTS

| | | | | |
|---|---|---|---|---|
| CN | 101759195 A | | 6/2010 | |
| CN | 102303861 A | | 1/2012 | |
| CN | 102398902 A | | 4/2012 | |
| CN | 105789575 A | * | 7/2016 | ............. B82Y 30/00 |
| EP | 0325487 A1 | | 7/1989 | |
| EP | 3 530 622 A1 | | 8/2019 | |
| JP | 2-4452 A | * | 1/1990 | |
| JP | 02004452 A | | 1/1990 | |
| JP | 2009091236 A | | 4/2009 | |
| JP | 2009513709 A | | 4/2009 | |
| KR | 20180006553 A | | 1/2018 | |
| WO | 2015165061 A1 | | 11/2015 | |
| WO | 2018079556 A1 | | 5/2018 | |

OTHER PUBLICATIONS

Zhang et al (Metal oxide nanoparticles deposited onto carbon-coated halloysite nanotubes, Applied Clay Science, 2014) (Year: 2014).*

Han, L., et al., "Study on Purification of Halloysite Nanotubes", Aug. 31, 2011, No. 4, pp. 36-40, Conservation and Utilization of Mineral Resources (abstract only).

Wang, Q., "Surface Modification of Halloysite Nanotubes and Research on Properties of Supported Pt Nano Catalysts", Chinese Master's Theses Full-text Database, Engineering Science and Technology, vol. I, 10 pages, with translation (2012).

Chinese Office Action with Search Report for Chinese Application No. 201980026442.4, dated Nov. 23, 2022, 9 pages.

International Search Report and Written Opinion for International Application No. PCT/JP2019/017471, dated Jul. 2, 2019, 5 pages.

Extended European Search Report for European Application No. 19 793 214.8, mailed Mar. 19, 2021, 7 pages.

Korean Office Action for Korean Application No. 10-2020-7029815, dated Jul. 14, 2022, with Concise Statement of Relevance of Office Action, 6 pages.

Zivica et al., "High strength metahalloysite based geopolymer, Composites Part B, 2014", (Year: 2014), pp. 155-165.

Chinese Office Action with Search Report for Chinese Application No. 201980026396.8, dated Nov. 1, 2022, 8 pages.

Chinese Office Action with Search Report for Chinese Application No. 201980026396.8, dated Apr. 20, 2023, 9 pages.

International Search Report and Written Opinion for International Application No. PCT/JP2019/017357, dated Jul. 2, 2019, 4 pages.

Extended European Search Report for European Application No. 19 792 629.8, mailed Mar. 19, 2021, 11 pages.

Japanese Office Action for Japanese Application No. 2020-515509, dated Jun. 15, 2021 with Concise Statement of Relevance of Office Action, 3 pages.

Raghdi, A. et al., "Mullite-zirconia composites prepared from halloysite reaction sintered with boehmite and zirconia," vol. 146, May 31, 2017, pp. 70-80, XP085136622, Applied Clay Science, Elsevier, Amsterdam, NL.

Liu, M., et al., "Recent advance in research on halloysite nanotubes-polymer nanocomposite," vol. 39(8), Apr. 24, 2014, pp. 1498-1525, XP029040017, Progress in Polymer Science, Pergamon Press, Oxford, GB.

Yuan, P., et al., "Properties and applications of halloysite nanotubes: recent research advances and future prospects," vol. 112, May 25, 2015, pp. 75-93, XP029187493, Applied Clay Science, Elsevier, Amsterdam, NL.

Chengshan, J. et al., "Application of Guizhou Kaolin in Cracking Catalyst", Proceedings of the Sixth Annual Meeting of the FCC Collaborative Group, SINOPEC Catalytic Cracking Cooperative Group, Feb. 28, 1998, 8 pages with translation.

Non Final Office Action for U.S. Appl. No. 17/049,443, mailed Oct. 2, 2023, 33 pages.

Office Action issued by the U.S. Patent and Trademark Office in the U.S. Appl. No. 17/049,443, mailed Jan. 18, 2024, U.S. Patent and Trademark Office, Alexandria, VA. (16 pages).

Sanchez et al., "Development of Nano-Modified Concrete for Next Generation of Storage Systems", Technical Report, (Sep. 10, 2018), 3 pages.

Tan et al., "Natural halloysite nanotubes as mesoporous carriers for the loading of ibuprofen", Microporous and Mesoporous Materials, (Sep. 15, 2013), vol. 179, pp. 89-98.

Xie et al., "Magnetic Halloysite Nanotubes/Iron Oxide Composites for the Adsorption of Dyes", Chemical Engineering Journal, (Apr. 1, 2011), vol. 168, Issue 2, pp. 959-963.

Office Action issued by the U.S. Patent and Trademark Office in the U.S. Appl. No. 17/049,443, mailed Oct. 18, 2024, U.S. Patent and Trademark Office, Alexandria, VA. (11 pages).

Office Action issued by the U.S. Patent and Trademark Office in the U.S. Appl. No. 17/771,111, mailed Oct. 29, 2024, U.S. Patent and Trademark Office, Alexandria, VA. (23 pages).

* cited by examiner

METAHALLOYSITE POWDER AND PRODUCTION METHOD THEREFOR

CROSS REFERENCE TO RELATED APPLICATIONS

This is the U.S. National Phase application of PCT/JP2019/017471, filed Apr. 24, 2019, which claims priority to Japanese Patent Application No. 2018-084240, filed Apr. 25, 2018, the disclosures of these applications being incorporated herein by reference in their entireties for all purposes.

FIELD OF THE INVENTION

The present invention relates to metahalloysite powder and a method of producing the same.

BACKGROUND OF THE INVENTION

A halloysite nanotube that is tube-shaped halloysite has been used for various applications, taking advantage of the shape thereof (for example, see Patent Literature 1).

PATENT LITERATURES

Patent Literature 1: JP 2009-91236 A

SUMMARY OF THE INVENTION

In recent years, in the hope of expanding the applications, there are demands for development of new materials. Accordingly, the present inventor has focused on powder of metahalloysite that is a variant of halloysite.

Aspects of the present invention have been made in view of the above and aim at providing an unprecedented, novel material using metahalloysite and a method of producing the same.

The present inventor has made an intensive study to achieve the foregoing objects. As a result, the inventor found that powder obtained by, for example, spray-drying a slurry including a halloysite nanotube and an organic carbon and subsequently firing the resultant in an inert atmosphere at a predetermined temperature would become metahalloysite powder including a granule that is an aggregate of metahalloysite including a metahalloysite nanotube covered by elemental carbon, and aspects of the present invention have been completed.

That is, the inventor found that the above-described problem can be solved by the constitution described later.

(1) Metahalloysite covered by elemental carbon or metahalloysite including elemental carbon.

(2) Metahalloysite powder comprising a granule that is an aggregate of metahalloysite including a metahalloysite nanotube covered by elemental carbon, or metahalloysite powder comprising a granule that is an aggregate of metahalloysite including a metahalloysite nanotube that is tube-shaped metahalloysite, the metahalloysite including elemental carbon.

(3) The metahalloysite powder according to (2) above, wherein the granule includes a first pore derived from a tube hole of the metahalloysite nanotube, and a second pore different from the first pore.

(4) The metahalloysite according to (1) above or the metahalloysite powder according to (2) or (3) above, wherein a ratio of a BET specific surface area determined by a water vapor adsorption method to a BET specific surface area determined by a nitrogen adsorption method (BET specific surface area determined by water vapor adsorption method/BET specific surface area determined by nitrogen adsorption method) is not greater than 0.55.

(5) The metahalloysite according to (1) above or the metahalloysite powder according to any one of (2) to (4) above, wherein an amount of carbon determined by a combustion method is not less than 0.1 mass %.

(6) The metahalloysite according to (1) above or the metahalloysite powder according to any one of (2) to (5) above, wherein a differential pore distribution determined from a nitrogen adsorption isotherm by the BJH method exhibits two or more pore size peaks in a range from 10 to 100 nm.

(7) The metahalloysite according to (1) above or the metahalloysite powder according to any one of (2) to (6) above, wherein an average particle size is from 0.5 to 200 µm.

(8) The metahalloysite according to (1) above or the metahalloysite powder according to any one of (2) to (7) above, wherein a BET specific surface area determined by a nitrogen adsorption method is not less than 10 $m^2/g$.

(9) The metahalloysite according to (1) above or the metahalloysite powder according to any one of (2) to (8) above, wherein an average pore size is not less than 11.0 nm.

(10) The metahalloysite according to (1) above or the metahalloysite powder according to any one of (2) to (9) above, wherein a total pore area is not less than 12.0 $m^2/g$.

(11) The metahalloysite according to (1) above or the metahalloysite powder according to any one of (2) to (10) above, wherein a total pore volume is not less than 0.10 $cm^3/g$.

(12) A method of producing the metahalloysite powder according to any one of (2) to (11) above, the method comprising:
 a step of preparing a slurry containing a halloysite nanotube or a metahalloysite nanotube and an organic carbon,
 a step of preparing powder from the slurry, and
 a step of firing the prepared powder in an inert atmosphere at a firing temperature of not less than 500° C.

(13) The method of producing the metahalloysite powder according to (12) above, wherein the step of preparing powder from the slurry is a step of spray-drying the slurry.

As described below, aspects of the present invention provide an unprecedented, novel material using metahalloysite and a method of producing the same. Aspects of the present invention can provide a material having, for example, excellent adsorptive capacity on an organic substance.

DETAILED DESCRIPTION OF EMBODIMENTS OF THE INVENTION

Metahalloysite, the metahalloysite powder, and the method of producing the metahalloysite powder according to embodiments of the present invention will be described below.

In the specification, the numerical ranges indicated using "(from) . . . to . . . " include the former number as the lower limit value and the latter number as the upper limit value.

Summary of Halloysite

Halloysite is a clay mineral represented by $Al_2Si_2O_5(OH)_4 \cdot 2H_2O$, or $Al_2Si_2O_5(OH)_4$.

Halloysite assumes various shapes such as a tubular shape (hollow tubular shape), a spherical shape, an angular lump shape, a plate-like shape, and a sheet-like shape.

The inner diameter of a halloysite nanotube (the diameter of a tube hole), which halloysite nanotube is a tube-shaped (hollow tube-shaped) halloysite, is approximately from 10 to 20 nm, for example. The outer surface of the halloysite nanotube is mainly composed of silicate ($SiO_2$), and the inner surface of the halloysite nanotube is mainly composed of alumina ($Al_2O_3$).

Summary of Metahalloysite

"Metahalloysite" is the dehydrated halloysite, i.e., halloysite represented by $Al_2Si_2O_5(OH)_4$ from which OH was removed to assume a low-crystalline form, and is a term that has been conventionally, generally or idiomatically used to refer to a variant of halloysite.

Nonetheless, in accordance with aspects of the present invention, "metahalloysite" is defined as "a product obtained by firing halloysite at a specific firing temperature." The "specific firing temperature" is, for example, not lower than 500° C., preferably not lower than 500° C. and not higher than 1,000° C., more preferably not lower than 500° C. and not higher than 900° C., yet more preferably not lower than 500° C. and lower than 900° C., particularly preferably not lower than 500° C. and not higher than 850° C., and most preferably not lower than 500° C. and not higher than 800° C.

Figure 23:
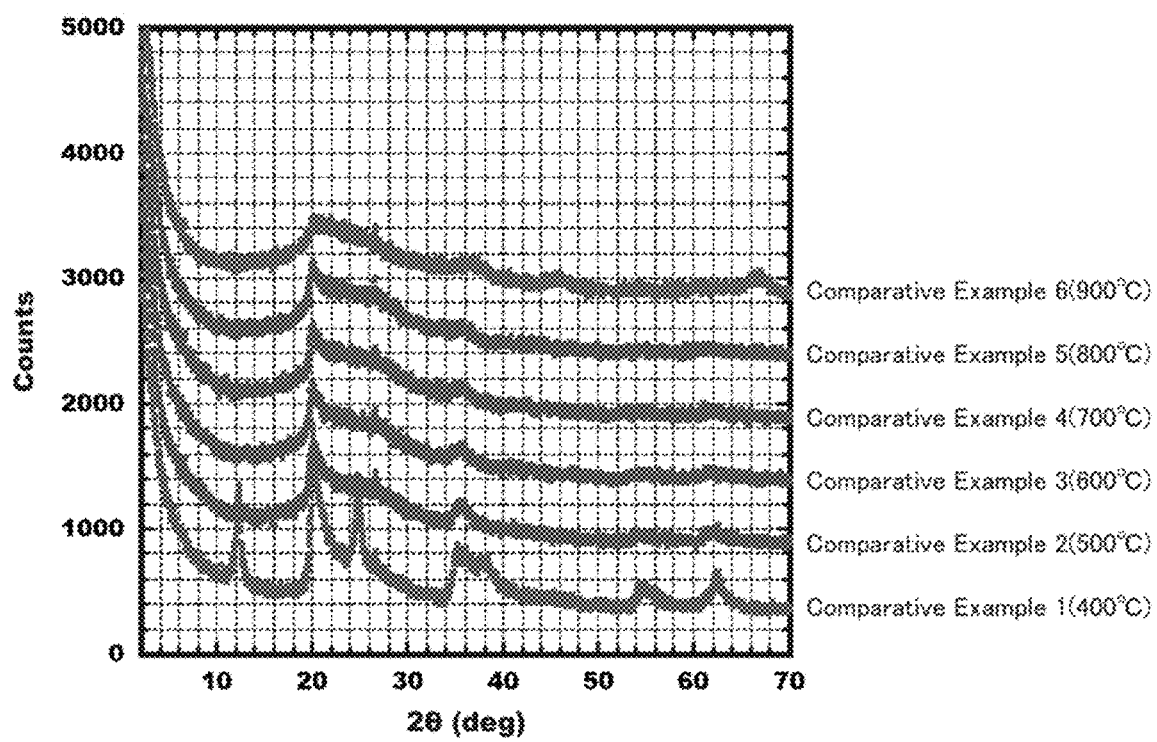
FIG. 23 is a graph showing the XRD patterns of powders of Comparative Examples 1 to 6.
Figure 24:
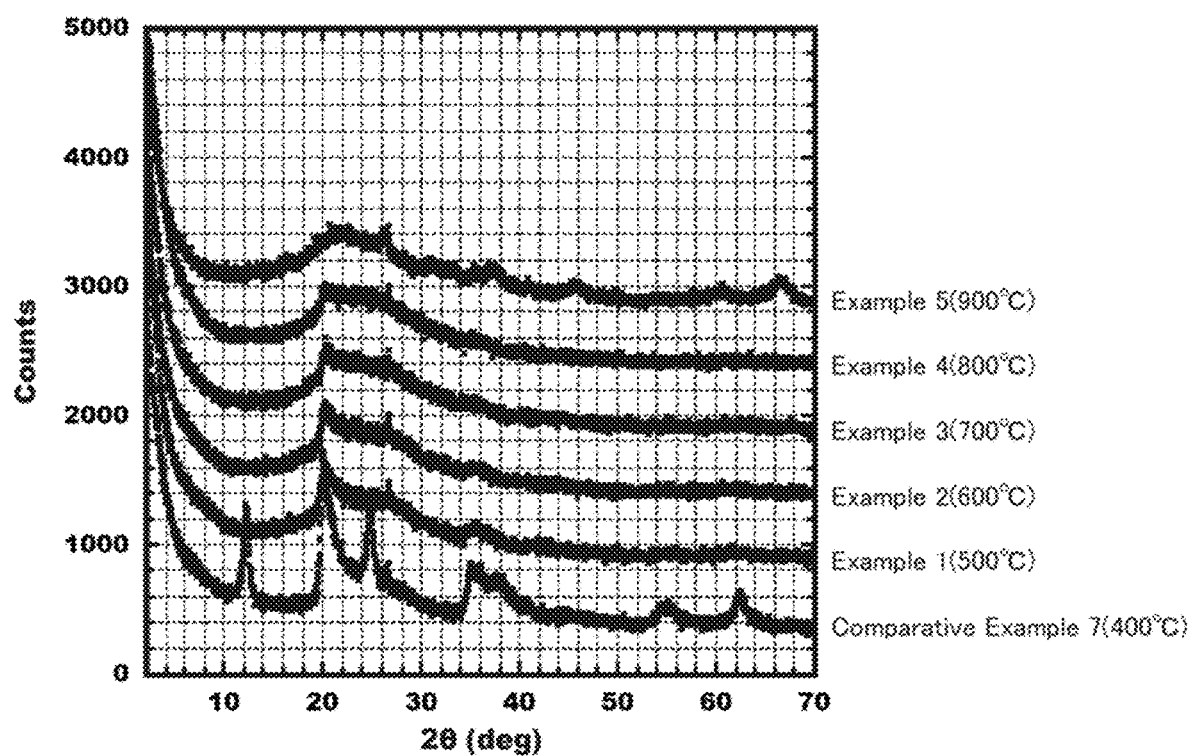
FIG. 24 is a graph showing the XRD patterns of powders of Comparative Example 7 and Examples 1 to 5.

As illustrated in the XRD patterns in FIG. 23 (firing in an air atmosphere) and FIG. 24 (firing in a nitrogen atmosphere), when halloysite is fired at a temperature lower than the specific firing temperature (400° C., for instance), the diffraction line of halloysite does not differ from that of an unfired case (not illustrated).

On the contrary, when halloysite is fired at a temperature within the range of the specific firing temperature, peaks representing halloysite disappear while broad peaks can be seen around $2\theta=20°$. Such the XRD pattern indicates the presence of metahalloysite.

Here, the temperature range of metahalloysite generation with firing in an air atmosphere does not differ from that in a nitrogen atmosphere, according to FIGS. 23 and 24.

In a case where halloysite is fired at 900° C., peaks representing $\gamma$-$Al_2O_3$ appear.

The chemical composition of metahalloysite has the same Al/Si ratio as that of the foregoing halloysite. Hence, it is virtually impossible to distinguish metahalloysite from halloysite and directly identify metahalloysite based on the chemical composition.

Other than the above, in order to find an indicator for identifying the metahalloysite characteristics using other methods or apparatuses, it would require so many repetitions of experimentation, which is too far from realization.

Meanwhile, a "metahalloysite nanotube" is "tube-shaped metahalloysite" and can be regarded as a "product obtained by firing a halloysite tube at a specific firing temperature."

[Metahalloysite and Metahalloysite Powder According to Aspects of Present Invention]

Metahalloysite according to aspects of the present invention is metahalloysite covered by elemental carbon (metahalloysite at least part of whose surface covered by elemental carbon) or metahalloysite including elemental carbon.

The metahalloysite powder according to aspects of the present invention is metahalloysite powder comprising a granule that is an aggregate of metahalloysite including a metahalloysite nanotube covered by elemental carbon (metahalloysite nanotube at least part of whose surface covered by elemental carbon) or metahalloysite powder comprising a granule that is an aggregate of metahalloysite including a metahalloysite nanotube, i.e., a tube-shaped metahalloysite, the metahalloysite including elemental carbon (hereinafter, simply referred to as "powder according to aspects of the present invention").

Carbon in materials is classified into organic carbon (carbon included in an organic substance) and inorganic carbon, and inorganic carbon is classified into carbonate carbon (carbon included in carbonate ions) and elemental carbon.

It stands to reason that, in view of its production method and its color being black, carbon in accordance with aspects of the present invention is understood as elemental carbon that basically includes only carbon atoms.

The metahalloysite nanotube covered by or including elemental carbon can be produced as described below.

Halloysite or metahalloysite including organic carbon (e.g., a polycarboxylate type surfactant (surfactant having a carboxy group)) is fired in an inert nitrogen atmosphere at a specific firing temperature, whereby black powder can be obtained. This is apparently because elemental carbon generated through carbonization of the polycarboxylate type surfactant (organic carbon) covers the surface of metahalloysite. The foregoing carbonization involves dehydration and decomposition of a carboxylic acid and forms elemental carbon as a carbide.

Examples of organic carbon for use include an organic surfactant other than the foregoing polycarboxylate type surfactant and other various polymer compounds as raw materials for elemental carbon. It is not limited to use only a single type of organic carbon alone, and multiple types of organic carbon may be used in combination.

Examples of an inert atmosphere include an argon atmosphere, in addition to a nitrogen atmosphere.

The specific firing temperature is appropriately selected depending on the type of organic carbon and is generally in a range of not lower than 500° C.

While the type and an amount of organic carbon determine an amount of elemental carbon to be generated and alter the coverage and the thickness of elemental carbon covering metahalloysite and other physical properties, the type and an amount of organic carbon are appropriately selected as long as the object, the application, the cost and the like are satisfied.

When an excessive amount of organic carbon is present, or when the specific type of organic carbon is used, an amount of free elemental carbon not covering metahalloysite may be increased; such case is regarded as being encompassed in the scope according to aspects of the present invention.

Metahalloysite at least part of whose surface is covered by elemental carbon through firing in an inert atmosphere exhibits the following characteristics which are not exhibited by metahalloysite that is fired in an air atmosphere.

It was observed that powders of Comparative Examples 2 to 6 where unfired granules with an average particle size of 4.3 μm prepared by spray-drying were fired in the air have immediately settled down in water when an infinitesimal amount of each powder was gently scattered over the water surface, whereas powders of Examples 1 to 5 fired in a nitrogen atmosphere floated on the water surface.

In addition, while the BET specific surface area determined by the nitrogen adsorption method is similar between the case of air atmospheric firing and the case of nitrogen atmospheric firing, the BET specific surface area determined by the water vapor adsorption method is smaller in the case of nitrogen atmospheric firing by about 10 m²/g.

To be more specific, Comparative Example 4 (air atmospheric firing) and Example 3 (nitrogen atmospheric firing) have the BET specific surface areas determined by the nitrogen adsorption method of 76.5 m²/g and 71.4 m²/g, respectively, being at a similar level, but have the BET specific surface areas determined by the water vapor adsorption method of 49.3 m²/g and 37.1 m²/g, respectively, having a difference therebetween.

Similarly, Comparative Example 9 (air atmospheric firing) and Example 7 (nitrogen atmospheric firing) have the BET specific surface areas determined by the nitrogen adsorption method of 79.1 m²/g and 73.6 m²/g, respectively, being at a similar level, but have the BET specific surface areas determined by the water vapor adsorption method of 45.9 m²/g and 36.1 m²/g, respectively, having a difference therebetween.

As described above, metahalloysite according to aspects of the present invention or the powder according to aspects of the present invention has the improved hydrophobicity presumably because the surface thereof is imparted with the characteristics of elemental carbon.

By using a granule prepared by spray-drying as a raw material to be fired, the powder according to aspects of the present invention is obtained.

Compared to the powder not including such a granule (mere metahalloysite powder covered by elemental carbon, for instance), the powder according to aspects of the present invention exhibits effects including: easy automation and quantification in transportation, delivery, packaging and the like, owing to the good fluidity; size reduction for transportation, storage, packaging and the like, owing to the high bulk density; suppression of dust generation, i.e., scattering of fine powder to contaminate the surrounding environment, thereby reducing particularly concerns of nanosized particles for safety to human bodies; suppression of uneven distribution, i.e., segregation of the powder in a container caused by a difference in shape, size or the like of the particles, and reduction in deposition of the powder to a container, a machine wall, a packaging material and the like; and, when used as a catalyst or absorbent to contact with a gas or a liquid, reduction of the fluid resistance and promotion of easy separation/recovery or drying/reuse of the powder.

The granule of the powder according to aspects of the present invention exhibits the foregoing effects without inhibiting the functions of the elemental carbon-covered metahalloysite nanotube that is also the primary particle constituting the granule.

The granule that is an aggregate of metahalloysite including a metahalloysite nanotube covered by elemental carbon is not particularly limited and is preferably a granule that is an aggregate of metahalloysite including a metahalloysite nanotube covered by elemental carbon and that has a first pore derived from the tube hole of the metahalloysite nanotube and a second pore different from the first pore (granule according to aspects of the present invention).

While elemental carbon formed herein is amorphous carbon, this elemental carbon may be additionally subjected to an activating treatment so as to become activated carbon.

<XRD>

FIG. 23 is a graph showing the XRD patterns of the powders of Comparative Examples 1 to 6 (XRD patterns of powders fired in an air atmosphere at firing temperatures of 400° C., 500° C., 600° C., 700° C., 800° C. and 900° C. in order from the bottom), and FIG. 24 is a graph showing the XRD patterns of the powders of Comparative Example 7 and Examples 1 to 5 (XRD patterns of powders fired in a nitrogen atmosphere at firing temperatures of 400° C., 500° C., 600° C., 700° C., 800° C. and 900° C. in order from the bottom).

As shown in FIGS. 23 and 24, peaks representing halloysite ($Al_2Si_2O_5(OH)_4$) are observed in the XRD patterns of Comparative Example 1 (firing atmosphere: air, firing temperature: 400° C.) and Comparative Example 7 (firing atmosphere: nitrogen, firing temperature: 400° C.).

On the other hand, as shown in FIGS. 23 and 24, in the XRD patterns of Comparative Examples 2 to 5 (firing atmosphere: air, firing temperature: 500° C. to 800° C.) and Examples 1 to 4 (firing atmosphere: nitrogen, firing temperature: 800° C.), peaks representing halloysite disappear, and peaks representing γ-Al₂O₃ do not appear. Meanwhile, broad peaks are seen around 2θ=20°. In addition, as shown in FIGS. 23 and 24, in the XRD patterns of Comparative Example 6 (firing atmosphere: air, firing temperature: 900° C.) and Example 5 (firing atmosphere: nitrogen, firing temperature: 900° C.), peaks representing γ-Al₂O₃ are observed, and broad peaks are also observed. Such the XRD pattern indicates the presence of metahalloysite.

The specific conditions in the XRD measurement are as follows.
Instrument used: X-ray diffractometer, D8ADVANCE (available from BRUKER CORPORATION)
X-ray tube: CuKα
Optical system: Bragg-Brentano geometry
Tube voltage: 35 kV
Tube current: 40 mA
Detector: One-dimensional semiconductor detector
Scan range: 2 to 70 deg
Scan step: 0.021 deg
Scan speed: 4 deg/min

<SEM>

The fact that, in the powder according to aspects of the present invention, the granule according to aspects of the present invention is a granule constituted of an aggregate of metahalloysite including a metahalloysite nanotube, and includes a pore derived from the tube hole of the metahalloysite nanotube (first pore) can be confirmed with the Scanning Electron Microscope (SEM) images of the powder according to aspects of the present invention, for example.

Figure 7:
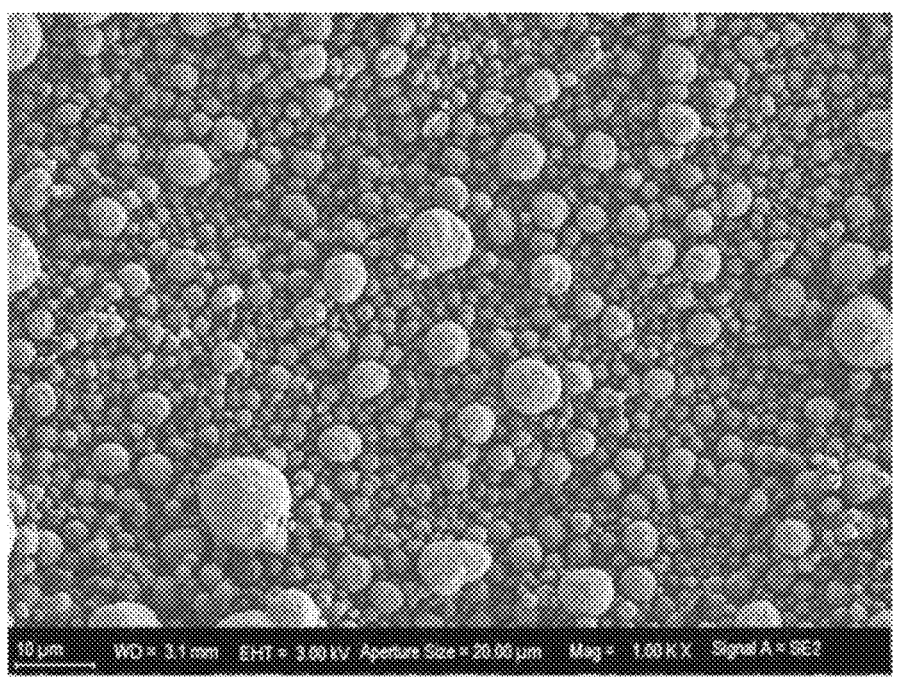
FIG. 7 is an SEM image showing powder of Example 3.
Figure 8:
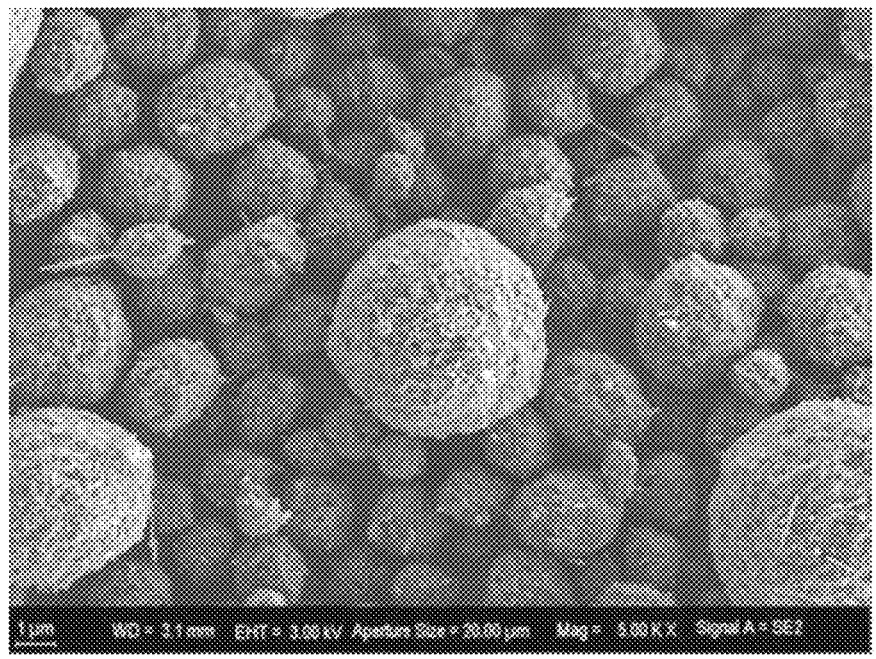
FIG. 8 is an SEM image showing the powder of Example 3 and is an enlarged image of FIG. 7.
Figure 9:
FIG. 9 is an SEM image showing the powder of Example 3 and is an enlarged image of FIG. 8.
Figure 10:
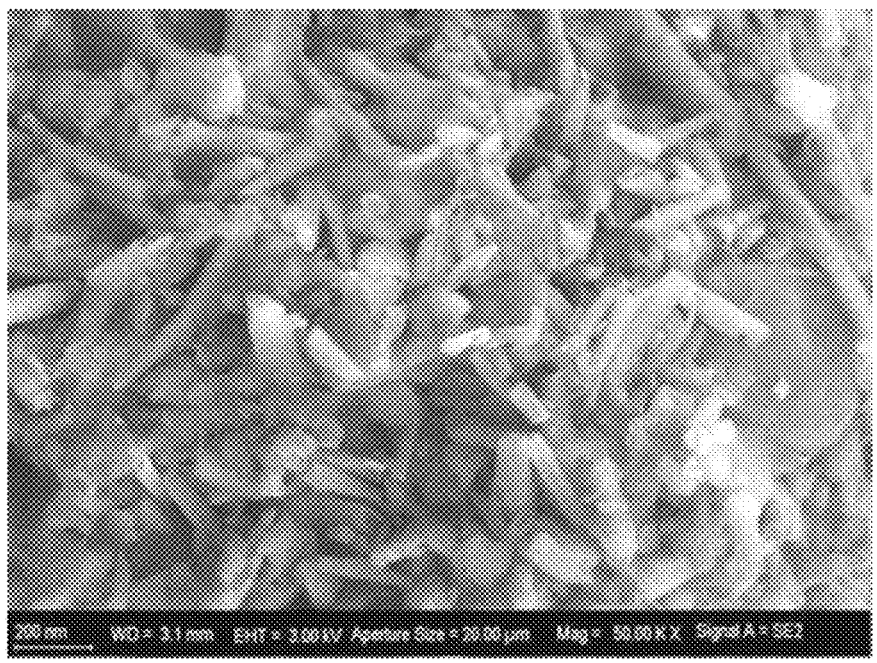
FIG. 10 is an SEM image showing the powder of Example 3 and is an enlarged image of FIG. 9.

FIGS. 7 to 10 are SEM images showing the powder of Example 3 described later. FIG. 8 is an enlarged image of FIG. 7, FIG. 9 is an enlarged image of FIG. 8, and FIG. 10 is an enlarged image of FIG. 9.

In FIGS. 7 and 8, spherical granules are observed. In FIGS. 9 and 10, the fact that the granules are each an aggregate of metahalloysite including a metahalloysite nanotube can be confirmed.

Further, in FIGS. 9 and 10 (especially, FIG. 10), the tube holes of the metahalloysite nanotubes (first pores derived from the tube holes of the metahalloysite nanotubes) can be observed on the surface of the granule.

In addition, in FIGS. 9 and 10, pores (second pores) with a larger size than that of the tube hole of the metahalloysite nanotube (normally, the inner diameter is approximately from 10 to 20 nm) can be observed on the surface of the granule.

The fact that the granule according to aspects of the present invention further includes the second pore different from the first pore can be confirmed, for example, in SEM images of the cross section of the granule (not shown). The cross section of the granule is exposed by, for example, processing the granules with Focused Ion Beams (FIB).

<Pore Distribution Measurement>

The fact that in the powder according to aspects of the present invention, the granule according to aspects of the present invention has the specific structure as described above can be confirmed also from the results obtained by measuring the pore distribution of the powder according to aspects of the present invention.

It is preferable for the powder according to aspects of the present invention that the differential pore distribution (log differential pore volume distribution) determined from a nitrogen adsorption isotherm by the BJH method exhibit two or more pore size peaks because the effect according to aspects of the present invention is more excellent.

In this regard, the two or more pore size peaks preferably appear in the range from 10 to 100 nm, more preferably from 10 to 70 nm, yet more preferably from 10 to 50 nm, and particularly preferably from 10 to 40 nm.

The details thereof will be described below.

Figure 20:
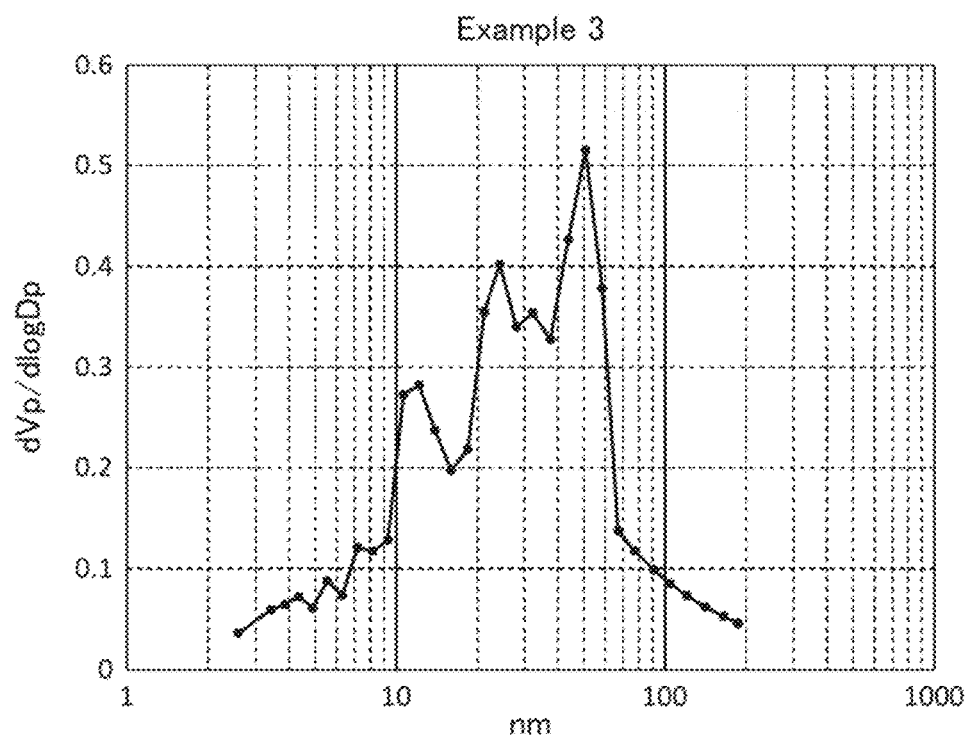
FIG. 20 is a graph showing the differential pore distribution of the powder of Example 3.
Figure 21:
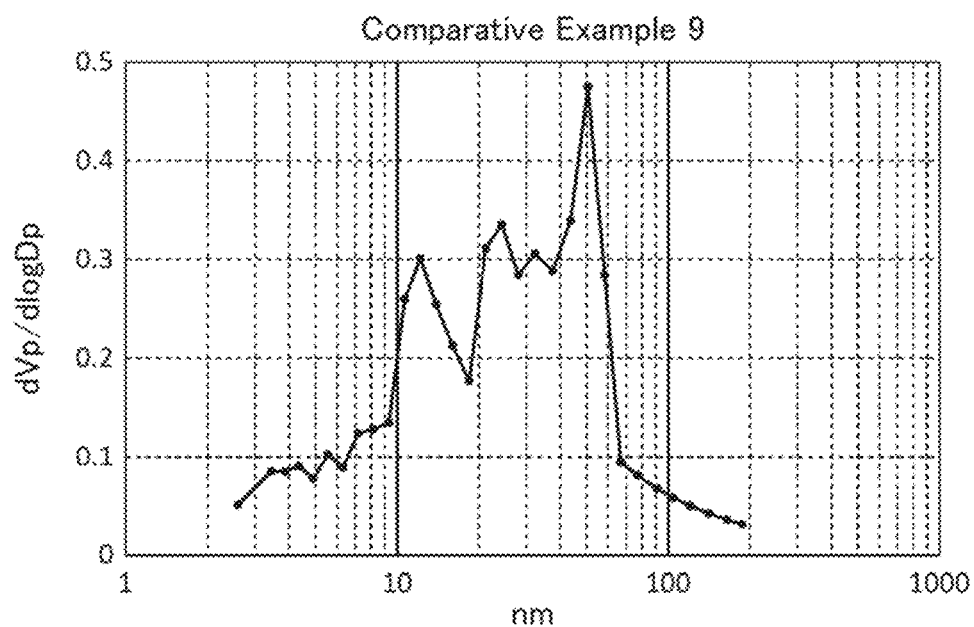
FIG. 21 is a graph showing the differential pore distribution of the powder of Comparative Example 9.

FIG. 20 is a graph showing the differential pore distribution (log differential pore volume distribution) determined from a nitrogen adsorption isotherm by the BJH method for the powder of Example 3 described later. The horizontal axis represents pore size (nm), and the vertical axis represents differential pore volume (dVp/dlogDp) (cm³/g) (the same applies hereinafter).

In the graph of FIG. 20 (Example 3), three pore size peaks clearly appear in the range from 10 to 100 nm. The pore size peak in the range from 10 nm to 20 nm represents the first pore derived from the tube hole of the metahalloysite nanotube (inner diameter: approximately from 10 to 20 nm), and the two pore size peaks in the range greater than 20 nm are regarded as both representing the second pore different from the tube hole.

It is understood that, in the powder of Example 3, the second pores are formed in the granule, and the pore sizes thereof are roughly classified into two types. It is presumed that the viscosity of the slurry used in the preparation of the powder, the dispersibility of the particles, and the like affect the second pore.

It is preferable for the powder according to aspects of the present invention that two or more pore size peaks appear within the range from 10 to 100 nm as shown in FIG. 20, because the effect according to aspects of the present invention is more excellent.

The pore size peak corresponding to the first pore preferably appears in the range from 10 nm to 20 nm. The pore size peak corresponding to the second pore preferably appears in the range of greater than 20 nm and not greater than 100 nm, more preferably greater than 20 nm and not greater than 70 nm, yet more preferably greater than 20 nm and not greater than 50 nm, and particularly preferably greater than 20 nm and not greater than 40 nm.

Figure 22:
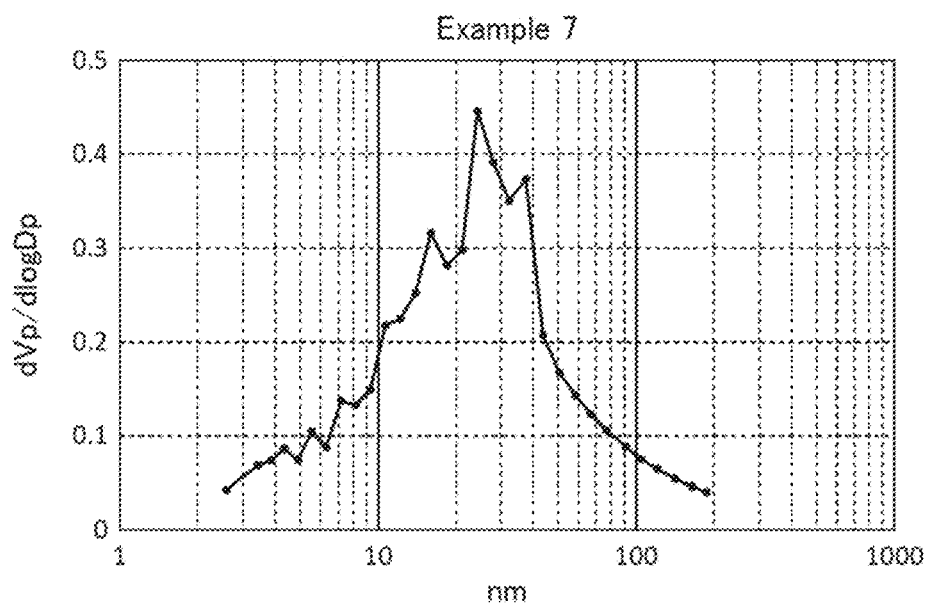
FIG. 22 is a graph showing the differential pore distribution of the powder of Example 7.

FIG. 22 is a graph showing the differential pore distribution of the powder of Example 7 described later, and as with FIG. 20, two or more pore size peaks clearly appear in the range from 10 nm to 100 nm. It is understood that the pore size peak in the range from 10 nm to 20 nm represents the first pore, and the pore size peak in the range greater than 20 nm represents the second pore.

When the granule constituting the powder according to aspects of the present invention is the foregoing granule according to aspects of the present invention, the powder according to aspects of the present invention has the second pore and thus has a large total pore area and a large total pore volume described later.

Specifically, the total pore area of the powder according to aspects of the present invention is, for example, not less than 12.0 m²/g, preferably not less than 50.0 m²/g, more preferably not less than 59.0 m²/g, yet more preferably not less than 65.0 m²/g, and particularly preferably not less than 75.0 m²/g, because the effect according to aspects of the present invention is more excellent. The upper limit of the total pore area is not particularly limited, and, for example, is not greater than 200.0 m²/g, and preferably not greater than 150.0 m²/g, because the effect according to aspects of the present invention is more excellent.

The total pore volume of the powder according to aspects of the present invention is, for example, not less than 0.10 cm³/g, preferably not less than 0.20 cm³/g, and more preferably not less than 0.23 cm³/g, because the effect according to aspects of the present invention is more excellent. The upper limit of the total pore volume is not particularly limited, and, for example, is not greater than 0.80 cm³/g, and preferably not greater than 0.60 cm³/g, because the effect according to aspects of the present invention is more excellent.

In addition, the average pore size of the powder according to aspects of the present invention is, for example, not less than 5.0 nm and preferably not less than 11.0 nm, because the effect according to aspects of the present invention is more excellent. The upper limit of the average pore size is not particularly limited, and, for example, is not greater than 30.0 nm, and preferably not greater than 25.0 nm, because the effect according to aspects of the present invention is more excellent.

The BET specific surface area (specific surface area determined by the BET method) of the powder according to aspects of the present invention is, for example, not less than 10 m²/g, preferably not less than 30 m²/g, and more preferably not less than 50 m²/g, because the effect according to aspects of the present invention is more excellent. The upper limit of the BET specific surface area is not particularly limited and is, for instance, not greater than 200 m²/g and preferably not greater than 150 m²/g, because the effect according to aspects of the present invention is more excellent.

Next, the method of measuring the pore distribution and the like will be described.

A pretreatment (vacuum-deaeration at 120° C. for 8 hours) is first performed on powder, and then a nitrogen adsorption-desorption isotherm is measured by a constant volume method under the following conditions. The equilibrium waiting time refers to the waiting time after reaching an adsorption equilibrium state.

The BET specific surface area (m²/g) is determined by applying the BET method using the nitrogen adsorption isotherm.

The average pore size (nm) is calculated from the values of the BET specific surface area and the total pore volume (cm³/g). The total pore volume used for calculation of the average pore size (for convenience, also referred to as "total pore volume for calculation") is determined from the adsorption amount at a relative pressure of 0.99 on the adsorption isotherm, assuming that capillary condensation occurs in pores that are present at relative pressures up to 0.99 on the adsorption isotherm.

Furthermore, the log differential pore volume distribution, the total pore volume (cm³/g), and the total pore area (m²/g) are determined by applying the BJH method using the FHH reference curve from the nitrogen adsorption isotherm. The standard conditions of analysis software are used for the plot intervals of the pores of approximately from 2.6 nm to 200 nm in size. Note that the total pore volume and the total pore area determined by the BJH method are respectively referred to as "BJH total pore volume" and "BJH total pore area."

In accordance with aspects of the present invention, in the case of simply referring to "total pore volume" and "total pore area", the "total pore volume" and the "total pore area" respectively mean the "BJH total pore volume" and the "BJH total pore area" unless noted otherwise.

Adsorption temperature: 77 K
Nitrogen cross-sectional area: 0.162 nm²
Saturated vapor pressure: Measured
Equilibrium waiting time: 500 sec
Pretreatment instrument: BELPREP-vacII (available from MicrotracBEL Corp.)
Measurement instrument: BELSORP-mini (available from MicrotracBEL Corp.)
Analysis software: BELMaster Version 6.4.0.0 (available from MicrotracBEL Corp.)

<BET Specific Surface Area Determined by Water Vapor Adsorption Method>

The BET specific surface area of metahalloysite according to aspects of the present invention or the powder according to aspects of the present invention determined by the water vapor adsorption method is, for instance, 10 to 200 m²/g, and preferably 20 to 100 m²/g, because the effect according to aspects of the present invention is more excellent.

The BET specific surface area determined by the water vapor adsorption method is measured under the following conditions.

Instrument: BELSORP 18 PLUS-T (manufactured by BEL JAPAN, Inc.)
Measurement principle: constant volume method
Adsorption temperature: 298 K
Adsorption gas: water vapor <Bet Ratio>

For metahalloysite according to aspects of the present invention and the powder according to aspects of the present invention, the ratio of the BET specific surface area by the foregoing water vapor adsorption method to the BET specific surface area determined by the foregoing nitrogen adsorption method (hereinafter, also referred to as "BET ratio") is not particularly limited, and is not greater than 0.55, because the effect according to aspects of the present invention is more excellent. The lower limit of the BET ratio is not particularly limited and is typically not less than 0.1.

The BET ratio is correlated with hydrophilicity/hydrophobicity of the surface, and when the BET ratio is smaller, the surface has the higher hydrophobicity.

<Average Particle Size>

The average particle size of metahalloysite according to aspects of the present invention or the powder according to aspects of the present invention is not particularly limited, and appropriately selected depending on the application. The average particle size is, for example, from 0.5 to 200 µm. In a case where the powder according to aspects of the present invention is prepared by spray-drying, the average particle size is preferably from 1 to 100 µm.

The granules having such particle sizes may be increased in size through the granulation described above. Note that, in this case, the average particle size is preferably not greater than 5 mm.

Taking into account the size with which the granules can enter organs of respiration as a concern of harm, the granules preferably have the minimum size of not less than 1 µm.

The average particle size is dry-measured by using a laser diffraction-scattering type particle size distribution measuring apparatus (Microtrac MT3300EXII) available from MicrotracBEL Corp.

<C Amount Determined by Combustion Method>

In metahalloysite according to aspects of the present invention or the powder according to aspects of the present invention, an amount of carbon determined by the combustion method (hereinafter, also referred to as "C amount determined by the combustion method") is typically not less than 0.1 mass %. The C amount determined by the combustion method mainly depends on the above-described elemental carbon. The C amount determined by the combustion method is preferably not less than 0.2 mass %, more preferably not less than 0.3 mass %, yet more preferably not less than 0.4 mass % and particularly preferably not less than 0.5 mass %, because the effect according to aspects of the present invention is more excellent. The upper limit of the C amount determined by the combustion method is not particularly limited and is preferably not greater than 5.0 mass %, because the effect according to aspects of the present invention is more excellent.

The C amount determined by the combustion method refers to an amount of carbon determined by the combustion method through an analysis using CS844 manufactured by LECO Corporation and represents an amount of carbon in a sample (mass %).

Here, an amount of carbon is a value of the total amount of organic carbon (carbon contained in an organic substance), carbonate carbon (carbon contained in carbonate ions) and elemental carbon. In black powder of Examples in the present application, it can be estimated that elemental carbon accounts for the most of the amount.

The powder subjected to the measurement is powder that has been dried at 110° C. for 12 hours or more to remove physisorbed water therefrom, and thereafter an amount of carbon thereof is measured.

<Application>

Metahalloysite and the powder according to aspects of the present invention can be developed for a wide variety of applications.

Examples of the applications include cosmetics, coloring materials, nanoparticles for precision polishing, nanomagnetic materials, catalysts, catalyst supports, humidity-controlling materials, deodorants, deodorizers, adsorbents, sustained-release agents, anti-bacterial agents, pharmaceuticals, and artificial enzymes. The applications are not limited thereto.

In addition, when the powder according to aspects of the present invention has the pores derived from tube holes of metahalloysite nanotubes, the powder exhibits excellent humidity-control property as compared to powders having no pores derived from tube holes.

The powder according to aspects of the present invention is also suitable for fillers, coating materials, and the like, which impart characteristics such as weight reduction, thermal insulation, sound absorbing, and environmental cleaning.

In addition, metahalloysite or the powder according to aspects of the present invention is not only used alone for the foregoing applications but can be also applied as a hybrid body in which one or more kinds of ion, molecule, polymer, nanoparticle and the like with a size of not more than 100 nm is included in the powder for the improved functionality. For instance, when used as a hybrid body in which an effective ingredient such as a drug is included, it can be expected that the effective ingredient evenly acts, thereby prolonging the efficacy of the effective ingredient.

In particular, since metahalloysite and the powder according to aspects of the present invention are imparted with lipophilic properties owing to the function of elemental carbon on their surface, an application where metahalloysite and the powder according to aspects of the present invention exhibit an improved performance as compared with hydrophilic inorganic metahalloysite involving no elemental carbon can be expected. Examples of such the application include deodorants, deodorizers and adsorbents which utilize the excellent adsorptive capacity on an organic substance and also include cosmetics, coloring materials and sustained-release agents which utilize the improvements in wettability to an organic substance and dispersibility.

When the powder according to aspects of the present invention includes the second pores and when the second pores have a pore size close to the size of a bacteria or a virus, the powder can be used for trapping the bacteria or virus (hereinafter, called "virus and the like").

Specifically, for example, when the powder according to aspects of the present invention has excellent water resistance, the powder is suitable for a water purifying filter for trapping a virus and the like in water.

Other than these applications, in a case where the water resistance is excellent, even when contacting water in a process of being formed into a final product, the powder according to aspects of the present invention maintains the granule structure and exhibits the functions thereof.

[Production Method of Powder According to Aspects of Present Invention]

The method of producing the powder according to aspects of the present invention is not particularly limited and, is preferably a method including at least a step of preparing a slurry containing halloysite including a halloysite nanotube and organic carbon such as a surfactant (to become elemental carbon) (slurry preparation step), a step of preparing powder from the slurry (powder preparation step) and a step of firing the prepared powder in a nitrogen atmosphere at a firing temperature of not less than 500° C. (firing step) (hereinafter, also referred to as "the production method according to aspects of the present invention"), because the effect according to aspects of the present invention is more excellent.

Below, a preferred embodiment of the production method of the present invention is described.

<Slurry Preparation Step>

The slurry preparation step is not particularly limited as long as a slurry, in which halloysite including a halloysite nanotube and organic carbon are dispersed in a dispersion medium such as water, can be prepared. A preferred embodiment of the slurry preparation step will be described below. In the embodiment described below, a dispersed phase recovered after centrifugation corresponds to a slurry prepared in the slurry preparation step.

<<Raw Material (Iide Clay)>>

The Osodani factory (Osodani, Iidemachi, Nishiokitama-gun Yamagata) of the Iide mining works of JFE MINERAL Co., LTD. produces silica sand from deposits including silica sand and clay. Clay components (hereinafter, referred to as "Iide clay" for convenience) produced as a by-product in the process of purifying the silica sand can be used as a raw material.

Iide clay has plasticity and a water content of approximately 40 mass %. Iide clay is mainly composed of halloysite and fine sand (quartz) represented by $SiO_2$. Iide clay may further include a small amount of a cationic polymer flocculant.

Iide clay including water (including approximately 40 mass % of water) may be used as it is, or can be dried under the sun light in a natural manner for use (including semi-dried clay). Water-containing or semi-dried Iide clay may be dried using equipment.

Dried Iide clay may be pulverized, and further subjected to dry purification, classification, magnetic separation, color sorting, or the like as necessary, and used.

It goes without saying that, in addition to use of Iide clay which is rich in halloysite, a raw ore thereof can be also used.

<<Preparation of First Slurry>>

Next, a slurry (first slurry) in which Iide clay is dispersed in water is prepared. The method of dispersing Iide clay in water is not particularly limited, and, for example, known apparatuses such as a high-speed mixer, a disperser, a bead mill, and a homomixer can be used.

The solid content concentration of the first slurry is not particularly limited, and for example, is from 5 to 20 mass %.

<<Removal of Coarse Particles>>

Next, coarse particles are removed by, for example, sieving the first slurry. The aperture size of the sieve that is used is, for example, from 25 to 100 μm. As a sieve, for example, a sieve for Japanese Industrial Standards (JIS) test may be used. A common large-size wet sieving apparatus may be used in mass production. Other than the use of a sieve, coarse particles may be removed by performing sedimentation separation or using a wet type cyclone.

<<Filtering>>

Next, the first slurry from which the coarse particles have been removed, is filtered with suction using a filter, and the resulting dehydrated cake is recovered. In mass production, a dehydrator such as a filter press or an Oliver filter may be used, for example.

This filtering may be omitted, and the slurry from which coarse particles have been removed may be directly used as a second slurry described later. In this case, a dispersant may be added as necessary.

<<Preparation of Second Slurry>>

Water is added to the dehydrated cake, and the mixture was stirred at a high speed to produce a slurry (second slurry) in which Iide clay from which coarse particles have been removed is dispersed in water. As a dispersing machine, for example, known apparatuses such as a high-speed mixer, a disperser, a bead mill, and a homomixer may be used similarly to the case of the first slurry.

The solid content concentration of the second slurry is not particularly limited, and, for example, is from 5 to 30 mass %.

The dispersion state of particles (Iide clay) in the slurry significantly influences the precision of subsequent centrifugation. Thus, a surfactant is added as a dispersant in preparing the second slurry.

An anionic surfactant is preferably used as the surfactant, because the effect according to aspects of the present invention is more excellent. In particular, a polymer anionic surfactant (anionic polymeric surfactant) is preferably used from the perspective of obtaining a stable slurry by using a small amount of the surfactant.

Addition of the anionic polymeric surfactant can provide a second slurry having a higher concentration, and thus provides an effect of enhancing productivity in drying using, for instance, a spray-dryer described later.

Specific examples of the anionic polymeric surfactant include POIZ 520, 521, 530, and 532A (available from Kao Corporation), which are special polycarboxylate type surfactants, from the perspective of obtaining a stable second slurry that does not cause sedimentation even when left standing.

KAOCER 2000, 2020, 2110 (available from Kao Corporation), or the like, which includes no metal ion such as sodium or potassium, may be used depending on the application.

The surfactant content of the second slurry is not particularly limited, and is preferably, for example, from 0.5 to 3.0 mass % relative to the total solid content of the second slurry.

When the surfactant content is too small, the dispersion of particles of halloysite and fine sand in the second slurry may be insufficient. On the other hand, when the surfactant content is too large, the surfactant may cause aggregation or costs may increase. In such a case, the surfactant may further cause problems in subsequent processes (for example, decrease in recovery rate of a dispersed phase in centrifugation, insufficient drying in spray-drying, or insufficient compaction or burning in firing).

<<Centrifugation>>

The obtained second slurry is subjected to centrifugation, thereby being separated into a sedimented phase of a lower layer and a dispersed phase of an upper layer. The sedimented phase includes a large amount of fine sand, and the dispersed phase includes a large amount of halloysite. The solid content concentration of the dispersed phase (slurry) is, for example, from 2 to 10 mass %.

The centrifugal force and treatment time for centrifugation are respectively from 2000 to 3000 G and from 3 to 30 minutes, for example, but are not limited to these numerical ranges. They are appropriately determined taking into account a dispersion state, application, costs, and the like.

A large-size centrifugal separator may be used for mass production.

After centrifugation, a dispersed phase can be recovered by suction using a pump or the like. A skimming nozzle may be used for recovering the dispersed phase. Halloysite may be thus purified and separated from Iide clay including halloysite and fine sand. The fact that the recovered dispersed phase includes a halloysite nanotube can be confirmed by, for example, a transmission electron microscope (TEM) image (see, FIGS. 1 and 2).

Other Embodiments

The slurry preparation step is not limited to the embodiments described above. For example, in a case where a raw material other than Iide clay is used, the solid content concentration of the second slurry, the surfactant content of the second slurry, the centrifugation condition, and the like may be modified accordingly.

Reduction of processes (for example, omission of preparation of the first slurry, sieving, and/or filtering), addition of a process, or the like may be modified appropriately.

For example, halloysite (halloysite nanotube), commercially available from Sigma-Aldrich Co. LLC., may be dispersed in water using a known apparatus and used as a slurry prepared in this step. Commercially available halloysite nanotubes may be subjected to dry purification, classification, magnetic separation, color sorting, or the like as necessary and used.

In addition, metahalloysite (metahalloysite nanotubes) may be also used.

The slurry prepared in the slurry preparation step may be subjected to wet purification, classification, magnetic separation, or the like as necessary and used.

In order to increase an amount of elemental carbon, a surfactant or organic carbon other than the surfactant can be further added to the slurry.

<Powder Preparation Step>

The powder preparation step is a step of preparing powder from the slurry prepared in the slurry preparation step.

In the powder preparation step, when the slurry including halloysite nanotubes is spray-dried, for example, the halloysite nanotubes aggregate while maintaining their tube-shape, whereby the granule structure having the first pore described above is obtained. When the slurry is formed into granules by spray-drying or the like, the dispersion medium of the slurry is evaporated and removed from the granule (inside of the granule), whereby the second pore as described above is obtained. In the meantime, organic carbon such as a surfactant in the slurry remains in the powder obtained in the powder preparation step.

The powder obtained in the powder preparation step may be granulated by further performing treatments such as tumbling, stirring, and extruding. Thus, granules constituting the powder can be increased in size.

<<Spray-Drying>>

Examples of the powder preparation step include a step of spray-drying the slurry prepared in the slurry preparation step (for example, the foregoing dispersed phase obtained by centrifugation) to obtain powder.

In spray-drying the prepared slurry, a spray-dryer is used. The spray-dryer is an apparatus that instantly produces powder by spraying a liquid raw material in the form of minute droplets (i.e., forming the material into fine particles) and drying the droplets through application of hot air. The spray-dryer is a known apparatus, and examples thereof include spray-dryers available from Ohkawara Kakohki Co., LTD., Fujisaki Electric Co., LTD., Japan Chemical Engineering & Machinery Co., Ltd., and Yamato Scientific Co., Ltd.

In the spray-dryer, the size of the powder particles (granules) obtained by drying can be controlled by changing the size of the droplets obtained by spraying the liquid raw material (i.e., forming fine particles).

The method of forming the liquid raw material into fine particles by using a spray-dryer is not particularly limited. For example, a known method such as a two-fluid nozzle method, a pressure nozzle (compression nozzle) method, a four-fluid nozzle method (twin-jet nozzle method), or a rotating disc method can be appropriately selected according to the size of droplets desired. The size of the powder particles (granules) obtained by drying depends on, for example, the concentration of the slurry and/or the amount of the slurry to be treated. Thus, in addition to selecting an appropriate method for forming fine particles, the state of the slurry is appropriately selected to achieve a desired particle size.

For the method of bringing hot air into contact with sprayed droplets, a typically-employed concurrent flow method in which both of hot air and sprayed droplets are directed downward; a countercurrent flow method in which sprayed droplets are directed downward and the hot air is directed upward, that is, the flows of the hot air and sprayed droplets are countercurrents; a mixed flow method in which sprayed droplets are directed upward and hot air is directed downward; and the like are appropriately selected.

In spray-drying, heat is instantaneously applied, and therefore the powder itself does not reach a high temperature. In spray-drying, the powder is directly obtained by drying the slurry, and therefore treatments such as filtering, drying, and pulverizing are eliminated, preventing contamination that may occur during a series of the operations.

<<Media Fluidized Drying>>

The method of preparing powder from the slurry is not limited to the spray-drying described above, and, for example, media fluidized drying (drying using a fluidized bed including balls) may be employed.

The powder preparation step may be a step of media-fluidized-drying the slurry prepared in the slurry preparation step to obtain powder.

In summary, the media fluidized drying involves, for example, continuously supplying a slurry to be dried into a layer of ceramic balls (φ 1 to 3 mm) in a fluidized state, and thus adhering the slurry on the surfaces of the balls. Objects to be dried are instantly dried by heat conduction from the heated balls and convective heat transfer from fluidization hot air, and then peeled off from the surfaces of the balls by collision among the balls. The powder is thus obtained.

<Firing Step>

The production method according to aspects of the present invention includes a step of firing the powder obtained in the powder preparation step in a nitrogen atmosphere at a firing temperature of not less than 500° C. (firing step). Through the firing at such the firing temperature, halloysite constituting granules becomes metahalloysite. In addition, owing to the firing at such the firing temperature, the granular structure before firing is maintained. Besides, owing to the firing in a nitrogen atmosphere at such the firing temperature, organic carbon such as a surfactant in the powder obtained in the powder preparation step is carbonized to become elemental carbon. The above-described powder according to aspects of the present invention is obtained in this manner.

The firing temperature is preferably not lower than 500° C. and not higher than 1,000° C., more preferably not lower than 500° C. and not higher than 900° C., even more preferably not lower than 500° C. and lower than 900° C., particularly preferably not lower than 500° C. and not higher than 850° C., and most preferably not lower than 500° C. and not higher than 800° C., because the effect according to aspects of the present invention is more excellent.

The firing time is not particularly limited and is, for instance, from 0.5 to 2 hours, preferably from 0.75 to 1.5 hours.

The method of producing the powder according to aspects of the present invention is not limited to the foregoing production method according to aspects of the present invention.

For instance, when the firing step is carried out in an air atmosphere in place of a nitrogen atmosphere in the foregoing production method according to aspects of the present invention, metahalloysite powder from which organic carbon such as a surfactant in the powder obtained in the powder preparation step is removed (powder including no elemental carbon) is obtained. The obtained powder is immersed in a solution containing organic carbon and thereafter fired in a nitrogen atmosphere as with the foregoing production method according to aspects of the present invention, whereby the organic substance is carbonized to become elemental carbon, and thus the powder according to aspects of the present invention as described above is obtained.

In addition, after the powder according to aspects of the present invention is once obtained, the immersion and the firing are additionally repeated, or the slurry is again prepared, followed by repetition of the spray-drying or the like, whereby the proportion of elemental carbon or the physical properties can be controlled.

EXAMPLES

Aspects of the present invention are described below in further detail by way of examples. However, the present invention should not be construed as being limited to the following examples.

<Preparation of Powder>

The powders of Examples 1 to 8 and Comparative Examples 1 to 10 were prepared as described below.

<<Raw Material (Iide Clay)>>

Iide clay described above was used as a raw material. XRD measurement of Iide clay was performed, and peaks (not illustrated) that represent halloysite and fine sand (quartz) were observed.

<<Preparation of First Slurry>>

Iide clay and water were charged into a high-speed mixer (available from NISSEI Corporation, Ultra Homomixer UHM-20 (20 L)), and subjected to a treatment for 10 minutes at 8,000 rpm, and thereby a first slurry in which Iide clay was dispersed in water (solid content concentration: 10 mass %) was obtained.

<<Removal of Coarse Particles>>

All of the first slurry was passed through a sieve for JIS test with an aperture of 45 µm to remove coarse particles remaining on the 45 µm mesh (approximately 30%). At that time, to prevent clogging and facilitate recovery of particles having passed through the 45 µm mesh, operations of adding water on the sieve and brushing off the particles on the sieve with a brush were appropriately performed. In a case where a sieve with an aperture of 25 µm or 100 µm was used, the final quality was the same.

<<Filtering>>

Next, the first slurry including particles having passed through the 45 µm mesh was filtered with suction using a filter, and a dehydrated cake was recovered.

<<Preparation of Second Slurry>>

The dehydrated cake and water were charged into a high-speed mixer (available from NISSEI Corporation., Ultra Homomixer UHM-20), and an anionic polymeric surfactant (available from Kao Corporation, POIZ 520) was added thereto. The mixture was subjected to a treatment for 10 minutes at 10,000 rpm, and thereby a second slurry in which Iide clay was dispersed in water (solid content concentration: 20 mass %) was obtained. The content of the anionic polymeric surfactant relative to the total solid content of the second slurry was 1.5 mass %.

<<Centrifugation>>

The second slurry was stirred, 80 mL per one tube was collected from the second slurry during stirring, and the collected slurry was placed in a centrifuge (available from Kokusan Corp., small-size desktop centrifugal machine H-19α, rotor: RF-109L, bucket: MF-109L, tube: 100 mL×4, made from PP, outer diameter: 45 mm, inner diameter: 40 mm, height: 100 mm).

Centrifugation was performed at a centrifugal force of 2470 G for 10 minutes to separate the slurry into a sedimented phase and a dispersed phase.

In the dispersed phase, the upper portion which was separated from the sedimented phase by not less than 5 mm was sucked with a pump and recovered as the dispersed phase. The solid content concentration of the recovered dispersed phase (slurry) was 4.7 to 6.7 mass % as shown in Table 1 below.

Figure 1:
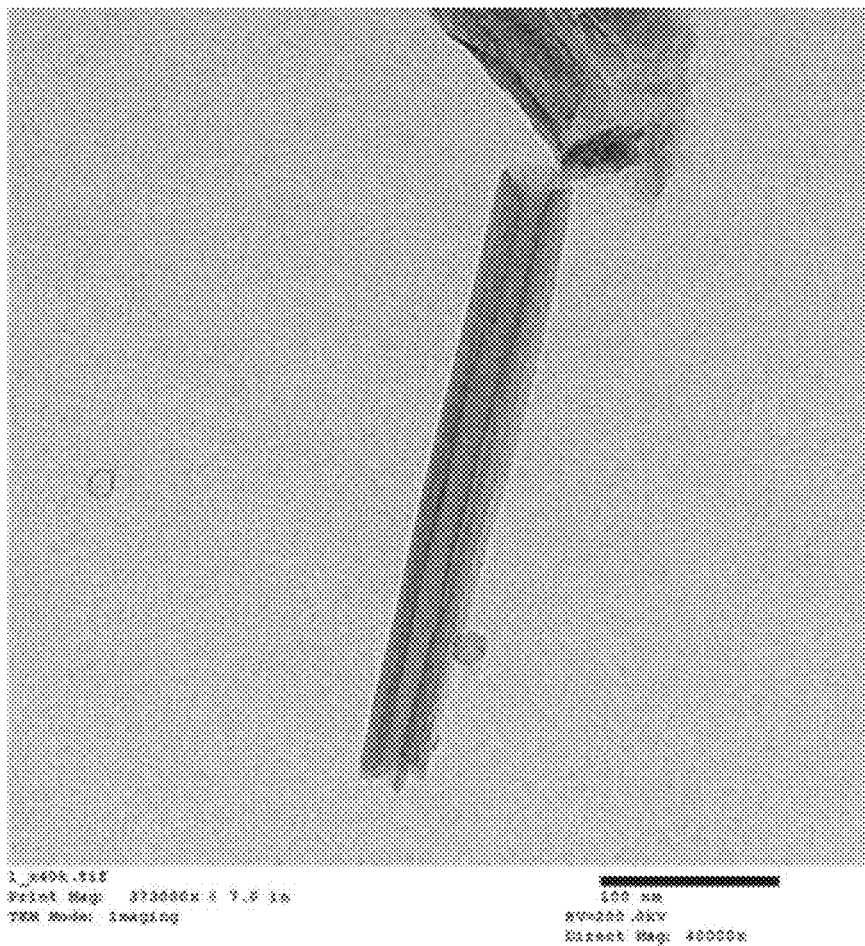
FIG. 1 is a TEM image of a dispersed phase recovered after centrifugation.
Figure 2:
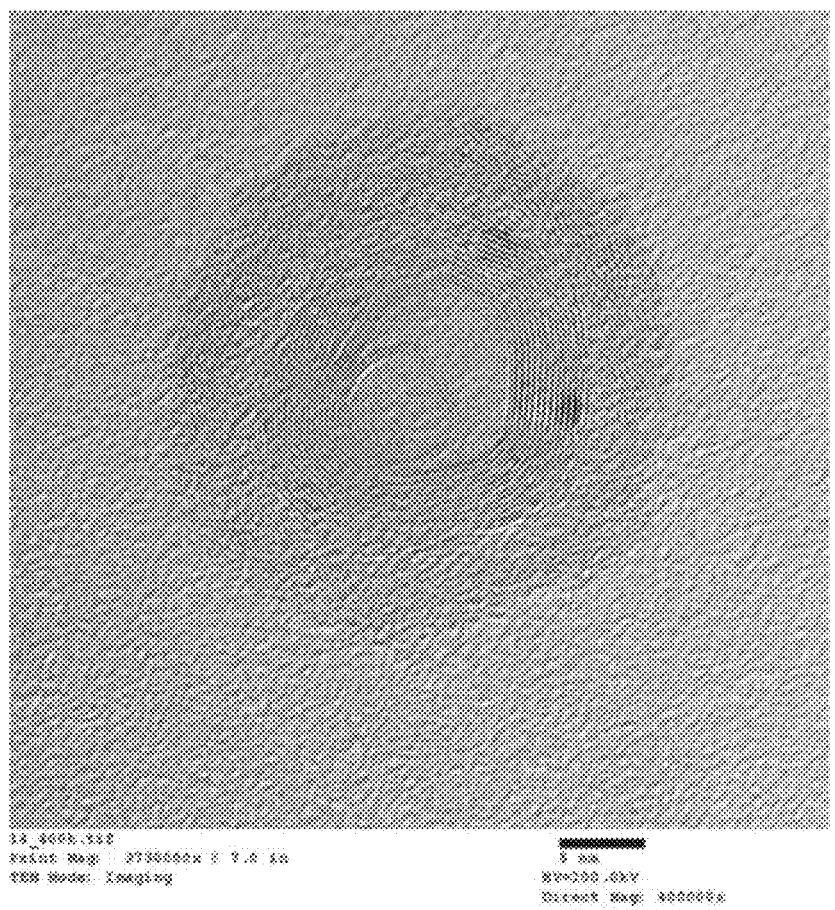
FIG. 2 is a TEM image of the dispersed phase recovered after centrifugation, taken in the field of view different from that of FIG. 1.

FIGS. 1 and 2 are TEM images of a dispersed phase recovered after centrifugation in Example 1. The fields of views of FIGS. 1 and 2 are different from each other. As shown in FIGS. 1 and 2, the presence of a halloysite nanotube was observed in the recovered dispersed phase. More specifically, a long halloysite nanotube can be seen in FIG. 1, and the side surface (cross section) of the halloysite nanotube can be seen in FIG. 2. Although not shown in the TEM images, halloysite with a shape other than a tubular shape (for example, a sheet-like shape) was also observed.

<<Spray-Drying>>

The recovered dispersed phase (slurry) was spray-dried by using a spray-dryer to obtain powder (halloysite powder).

The spray-dryer L-8i available from Ohkawara kakohki Co., LTD. was used as the spray-dryer. The slurry was dispensed to the spray-dryer with a pump at a constant volume, and formed into fine particles (sprayed). As the method of bringing hot air into contact with sprayed droplets, the concurrent flow method in which both of hot air and sprayed droplets are directed downward was used.

The spray-drying conditions (the solid content concentration of the slurry, the fine particle formation method, the evaporation amount of moisture (kg/h), the inlet temperature (° C.), and the outlet temperature (° C.)), the spray air pressure (MPa) when the four-fluid nozzle method (twin-jet nozzle method) is employed as the fine particle formation method, and the rotational speed (rpm) of the rotating disc when the rotating disc method is employed as the fine particle formation method are as shown in Table 1 below.

<<Firing>>

The powder was fired after spray-drying.

Specifically, the powder after spray-drying was heated using an electric furnace with Siliconit heating elements by increasing the temperature from room temperature at a temperature increase rate of 5° C./min. in the firing atmosphere (air atmosphere, nitrogen atmosphere) shown in Table 1 above and maintaining the temperature at the firing temperature shown in Table 1 above for 1 hour, and then the powder was cooled in the furnace. Ventilation was performed while a certain amount of air or nitrogen was supplied into the furnace.

TABLE 1

| Table 1 | Spray-drying | | | | | | | Firing | |
|---|---|---|---|---|---|---|---|---|---|
| | Fine particle formation method | Slurry Solid content concentration [mass %] | Spray air pressure [MPa] | Disc rotational speed [rpm] | Moisture evaporation amount [kg/h] | Inlet temperature [° C.] | Outlet temperature [° C.] | Firing atmosphere | Firing temperature [° C.] |
| CE 1 | Four-fluid nozzle method | 5.7 | 0.25 | — | 2.60 | 190 | 67 | Air | 400 |
| CE 2 | | 5.7 | 0.25 | — | 2.60 | 190 | 67 | Air | 500 |
| CE 3 | | 5.7 | 0.25 | — | 2.60 | 190 | 67 | Air | 600 |
| CE 4 | | 5.7 | 0.25 | — | 2.60 | 190 | 67 | Air | 700 |
| CE 5 | | 5.7 | 0.25 | — | 2.60 | 190 | 67 | Air | 800 |
| CE 6 | | 5.7 | 0.25 | — | 2.60 | 190 | 67 | Air | 900 |
| CE 7 | | 5.7 | 0.25 | — | 2.60 | 190 | 67 | Nitrogen | 400 |
| EX 1 | | 5.7 | 0.25 | — | 2.60 | 190 | 67 | Nitrogen | 500 |
| EX 2 | | 5.7 | 0.25 | — | 2.60 | 190 | 67 | Nitrogen | 600 |
| EX 3 | | 5.7 | 0.25 | — | 2.60 | 190 | 67 | Nitrogen | 700 |
| EX 4 | | 5.7 | 0.25 | — | 2.60 | 190 | 67 | Nitrogen | 800 |
| EX 5 | | 5.7 | 0.25 | — | 2.60 | 190 | 67 | Nitrogen | 900 |
| CE 8 | Rotating disc | 6.4 | — | 12,000 | 1.92 | 155 | 77 | Air | 600 |
| CE 9 | | 6.4 | — | 12,000 | 1.92 | 155 | 77 | Air | 700 |

TABLE 1-continued

| | | Spray-drying | | | | | | Firing | |
|---|---|---|---|---|---|---|---|---|---|
| Table 1 | Fine particle formation method | Slurry Solid content concentration [mass %] | Spray air pressure [MPa] | Disc rotational speed [rpm] | Moisture evaporation amount [kg/h] | Inlet temperature [° C.] | Outlet temperature [° C.] | Firing atmosphere | Firing temperature [° C.] |
| CE 10 | method | 6.4 | — | 12,000 | 1.92 | 155 | 77 | Air | 800 |
| EX 6 | | 6.4 | — | 12,000 | 1.92 | 155 | 77 | Nitrogen | 600 |
| EX 7 | | 6.4 | — | 12,000 | 1.92 | 155 | 77 | Nitrogen | 700 |
| EX 8 | | 6.4 | — | 12,000 | 1.92 | 155 | 77 | Nitrogen | 800 |

CE: Comparative Example
EX: Example

<Evaluation of Powder>

The powders of Examples 1 to 8 and Comparative Examples 1 to 10 were evaluated as described below.

It should be noted that the powders of Examples 1 to 8 were the powder according to aspects of the present invention as described above. Meanwhile, the powders of Comparative Examples 2 to 6 and 8 to 10 included granules that were aggregates of metahalloysite including metahalloysite nanotubes but did not include elemental carbon, thus being different from the powder according to aspects of the present invention as described above. In addition, the powder of Comparative Example 1 was powder including a granule that was an aggregate of halloysite including halloysite nanotubes and did not include elemental carbon, thus being different from the powder according to aspects of the present invention as described above.

<<Appearance>>

Appearance of the powders of Examples 1 to 8 and Comparative Examples 1 to 10 was evaluated. While the powders of Examples 1 to 8 were black in color, the powders of Comparative Examples 1 to 10 were brown. Accordingly, it is indicated that elemental carbon was generated in the powders of Examples 1 to 8 but was not generated in the powders of Comparative Examples 1 to 10.

<<XRD>>

The XRD measurement of the powders of Examples 1 to 5 and Comparative Examples 1 to 7 was performed. The measurement conditions are as described above.

FIG. 23 is a graph showing the XRD patterns of the powders of Comparative Examples 1 to 6 (XRD patterns of powders fired in an air atmosphere at firing temperatures of 400° C., 500° C., 600° C., 700° C., 800° C. and 900° C. in order from the bottom), and FIG. 24 is a graph showing the XRD patterns of the powders of Comparative Example 7 and Examples 1 to 5 (XRD patterns of powders fired in a nitrogen atmosphere at firing temperatures of 400° C., 500° C., 600° C., 700° C., 800° C. and 900° C. in order from the bottom).

As shown in FIGS. 23 and 24, peaks representing halloysite ($Al_2Si_2O_5(OH)_4$) were observed in the XRD patterns of Comparative Example 1 (firing atmosphere: air, firing temperature: 400° C.) and Comparative Example 7 (firing atmosphere: nitrogen, firing temperature: 400° C.).

On the other hand, as shown in FIGS. 23 and 24, in the XRD patterns of Comparative Examples 2 to 5 (firing atmosphere: air, firing temperature: 500° C. to 800° C.) and Examples 1 to 4 (firing atmosphere: nitrogen, firing temperature: 800° C.), peaks representing halloysite disappeared, and peaks representing $\gamma$-$Al_2O_3$ did not appear. Meanwhile, the XRD pattern characteristic having broad peaks around $2\theta=20°$ was confirmed. In addition, as shown in FIGS. 23 and 24, in the XRD patterns of Comparative Example 6 (firing atmosphere: air, firing temperature: 900° C.) and Example 5 (firing atmosphere: nitrogen, firing temperature: 900° C.), peaks representing $\gamma$-$Al_2O_3$ were observed, and broad peaks were also observed. Such the XRD pattern indicates the presence of metahalloysite.

It should be noted that a peak around $2\theta=26°$ is a peak representing quartz and indicates that a minute amount of quarts contained in the raw material is present.

The XRD patterns in FIG. 23 (firing atmosphere: air) are not largely different from the XRD patterns in FIG. 24 (firing atmosphere: nitrogen); it was indicated that generation of halloysite or metahalloysite would not vary depending on whether the firing atmosphere is air or nitrogen.

<<SEM>>

SEM images of the powders of Examples 1 to 8 and Comparative Examples 1 to 10 were taken.

Figure 3:
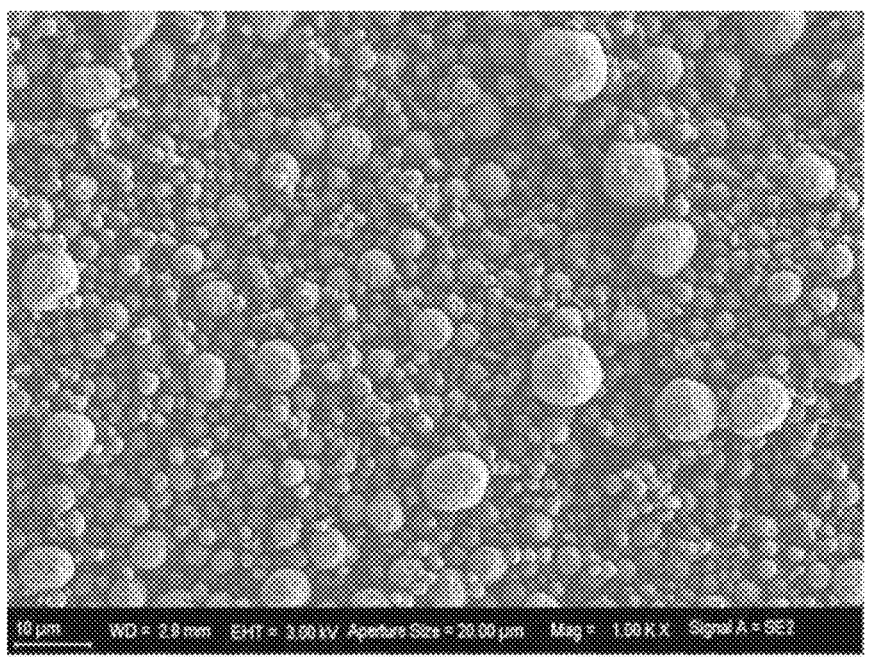
FIG. 3 is an SEM image showing powder of Comparative Example 4.
Figure 4:
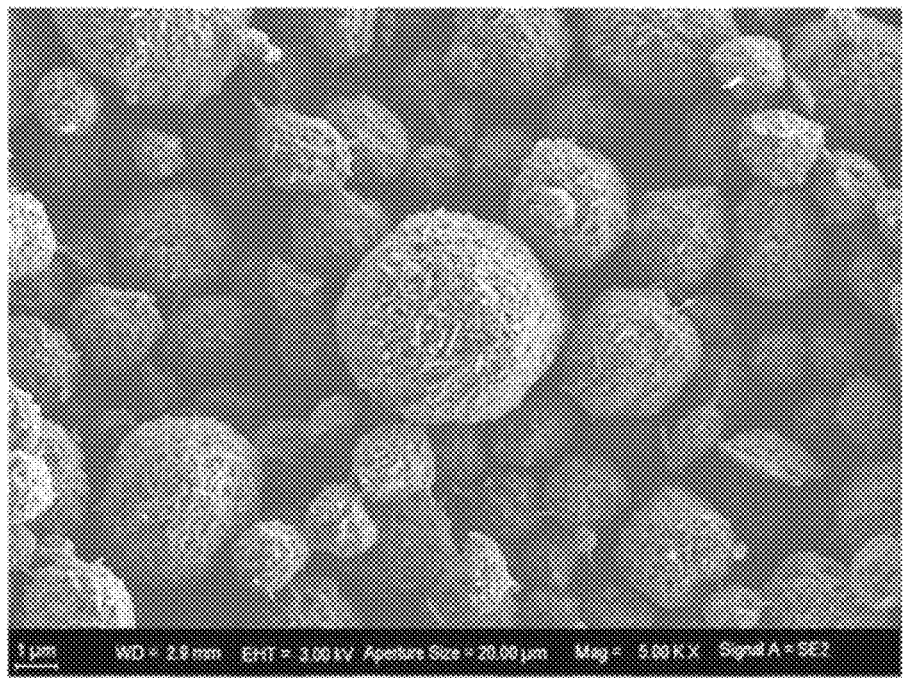
FIG. 4 is an SEM image showing the powder of Comparative Example 4 and is an enlarged image of FIG. 3.
Figure 5:
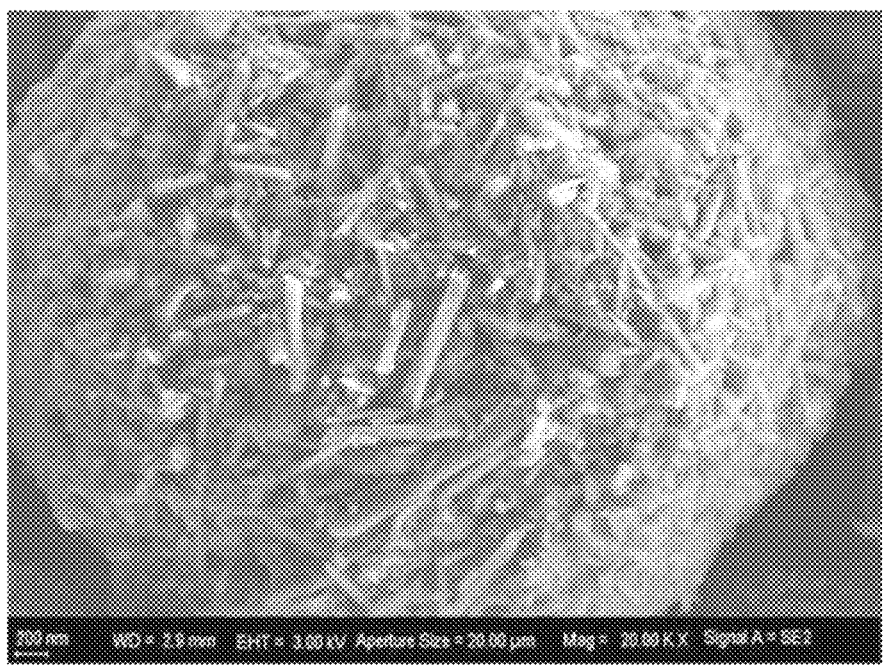
FIG. 5 is an SEM image showing the powder of Comparative Example 4 and is an enlarged image of FIG. 4.
Figure 6:
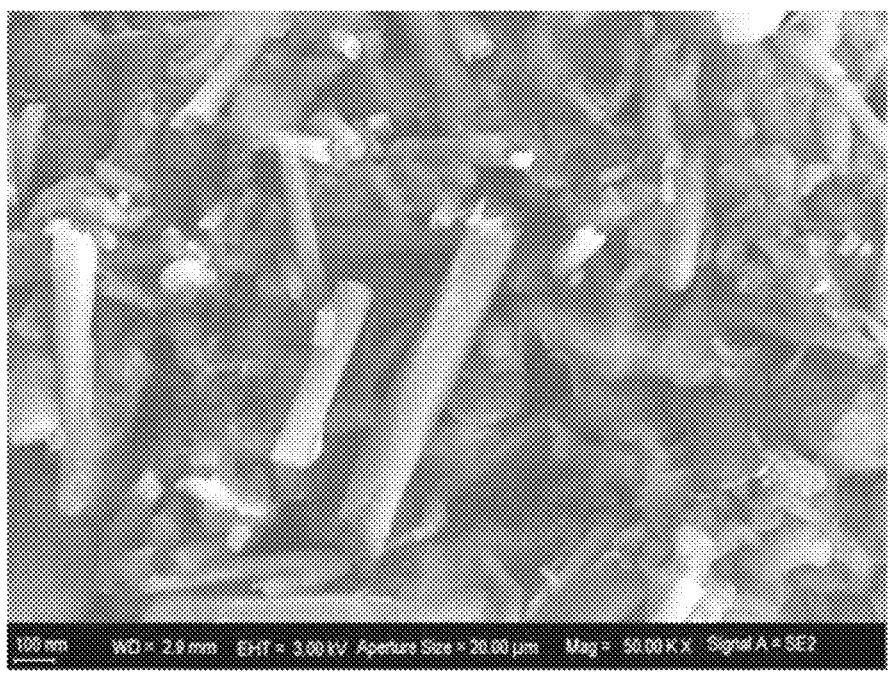
FIG. 6 is an SEM image showing the powder of Comparative Example 4 and is an enlarged image of FIG. 5.

FIGS. 3 to 6 are SEM images showing the powder of Comparative Example 4, FIG. 4 is an enlarged image of FIG. 3, FIG. 5 is an enlarged image of FIG. 4, and FIG. 6 is an enlarged image of FIG. 5.

FIGS. 7 to 10 are SEM images showing the powder of Example 3, FIG. 8 is an enlarged image of FIG. 7, FIG. 9 is an enlarged image of FIG. 8, and FIG. 10 is an enlarged image of FIG. 9.

Figure 11:
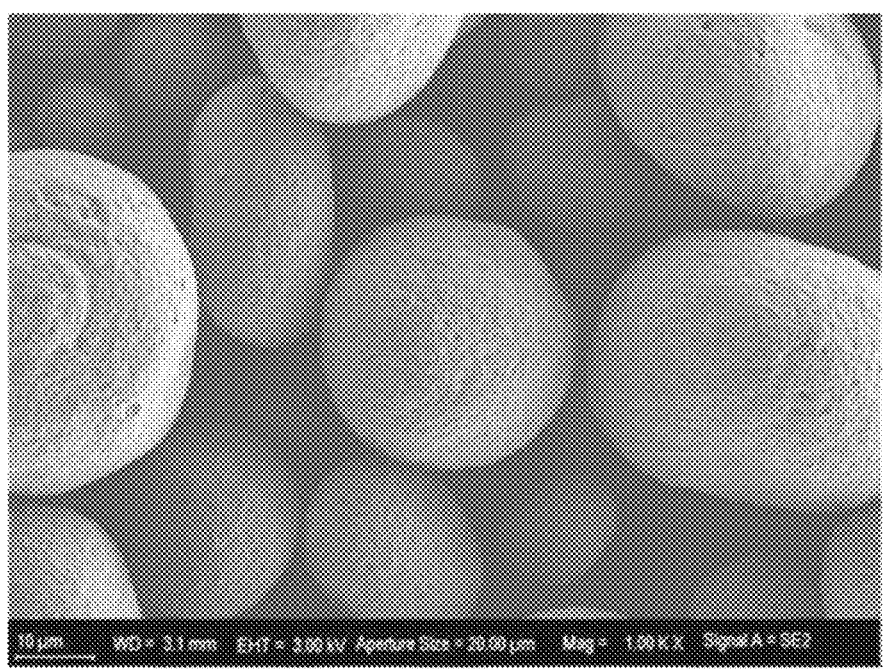
FIG. 11 is an SEM image showing powder of Comparative Example 9.
Figure 12:
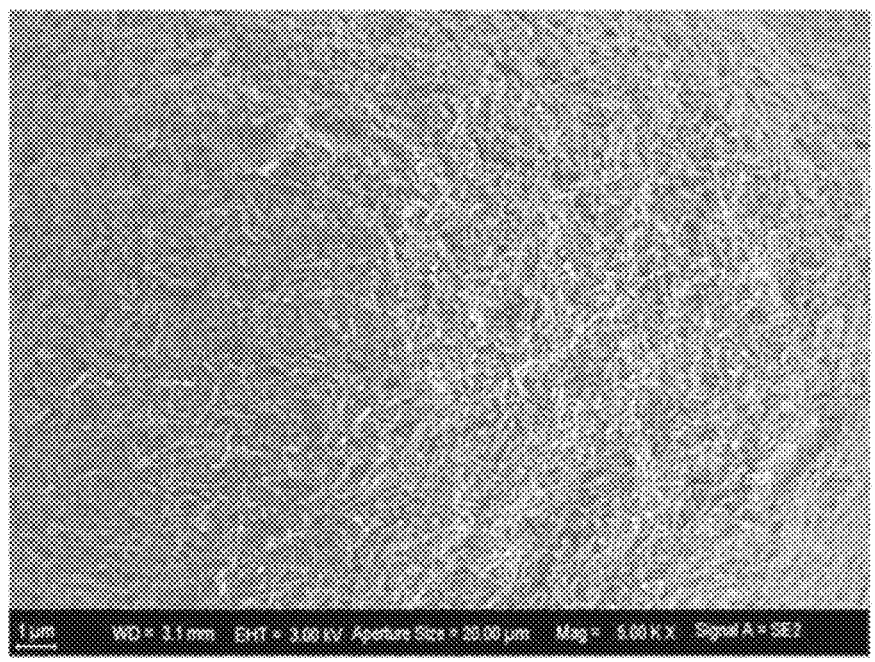
FIG. 12 is an SEM image showing the powder of Comparative Example 9 and is an enlarged image of FIG. 11.
Figure 13:
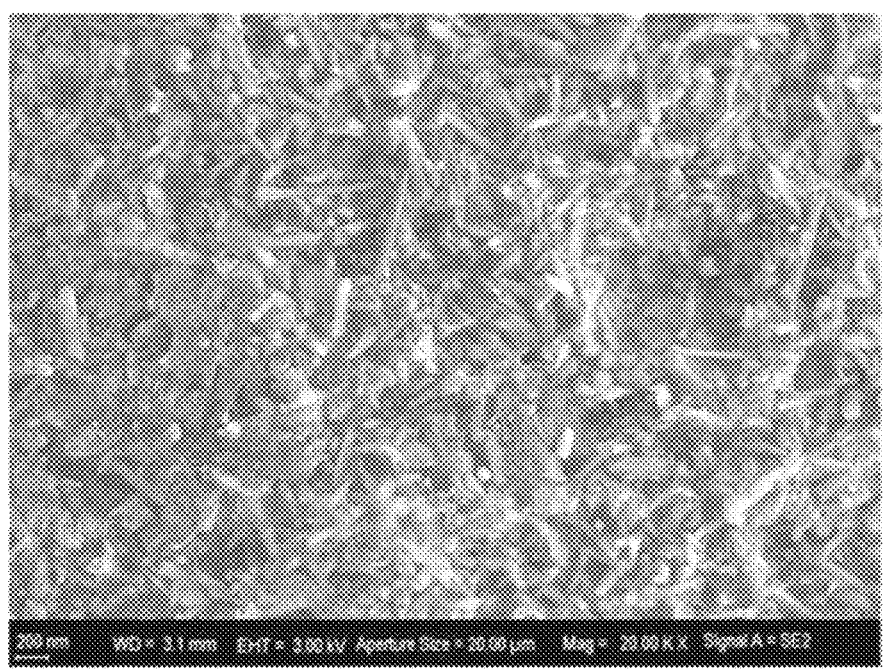
FIG. 13 is an SEM image showing the powder of Comparative Example 9 and is an enlarged image of FIG. 12.
Figure 14:
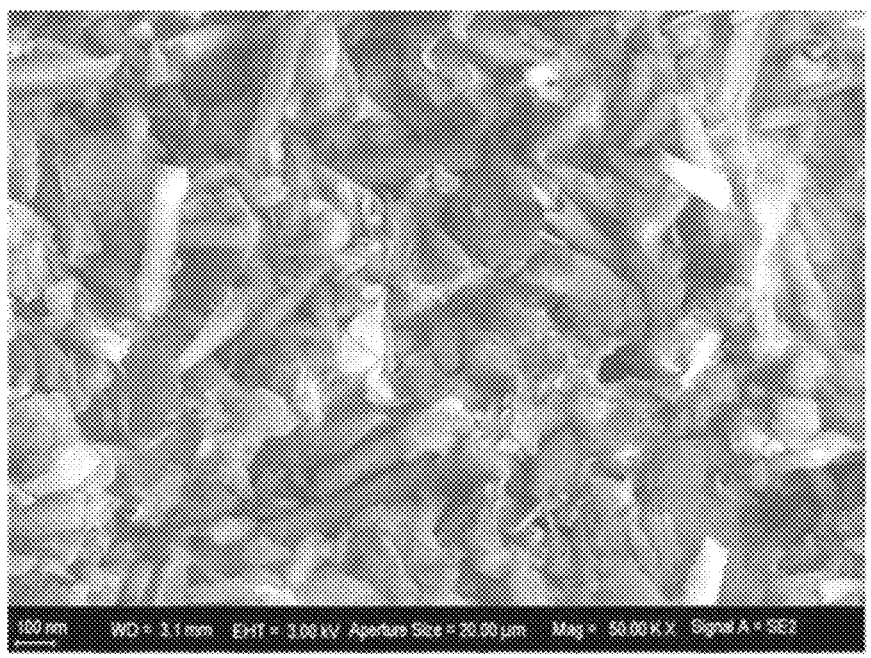
FIG. 14 is an SEM image showing the powder of Comparative Example 9 and is an enlarged image of FIG. 13.

FIGS. 11 to 14 are SEM images showing the powder of Comparative Example 9, FIG. 12 is an enlarged image of FIG. 11, FIG. 13 is an enlarged image of FIG. 12, and FIG. 14 is an enlarged image of FIG. 13.

Figure 15:
FIG. 15 is an SEM image showing powder of Example 7.
Figure 16:
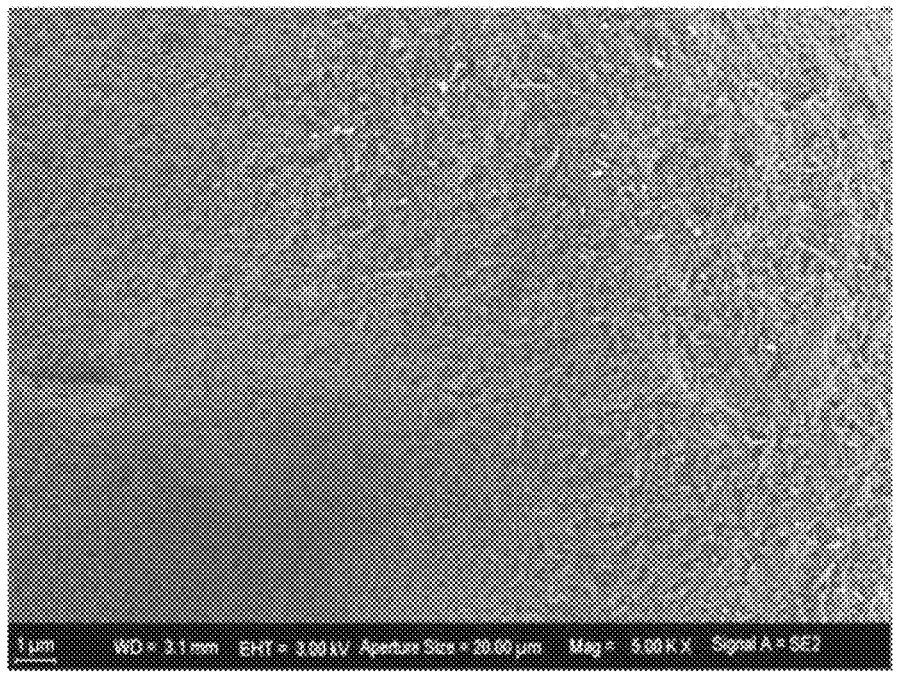
FIG. 16 is an SEM image showing the powder of Example 7 and is an enlarged image of FIG. 15.
Figure 17:
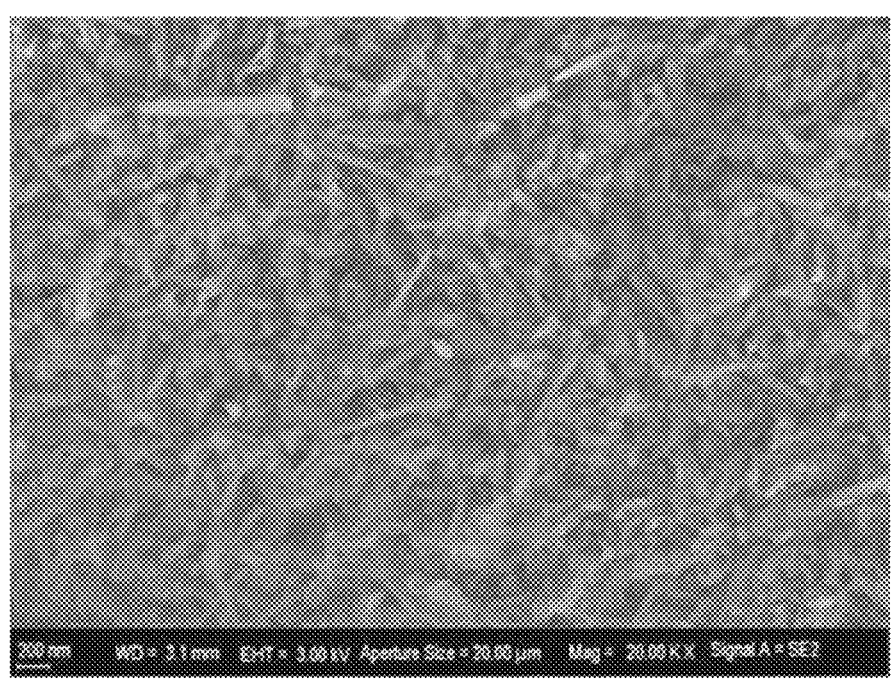
FIG. 17 is an SEM image showing the powder of Example 7 and is an enlarged image of FIG. 16.
Figure 18:
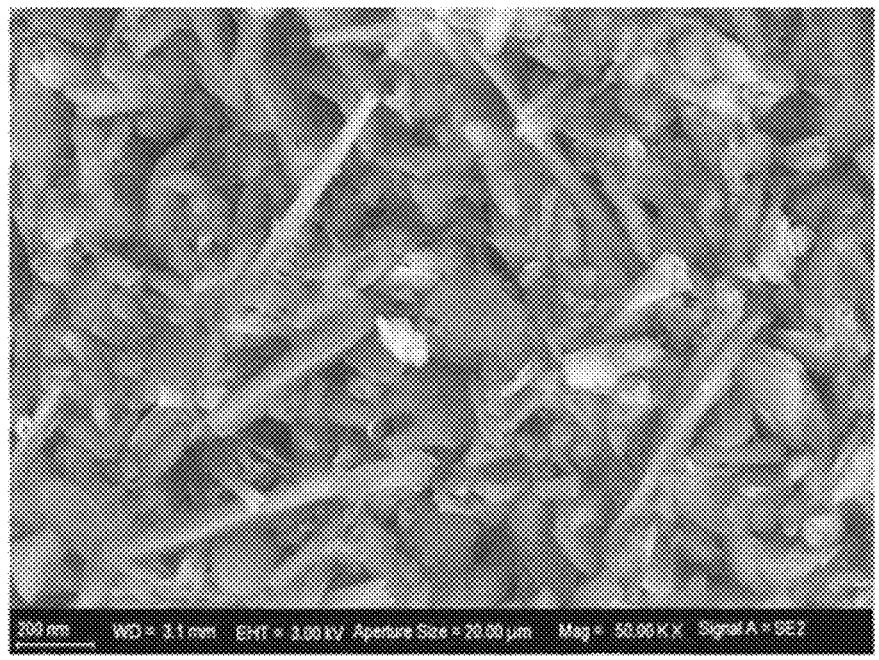
FIG. 18 is an SEM image showing the powder of Example 7 and is an enlarged image of FIG. 17.
Figure 19:
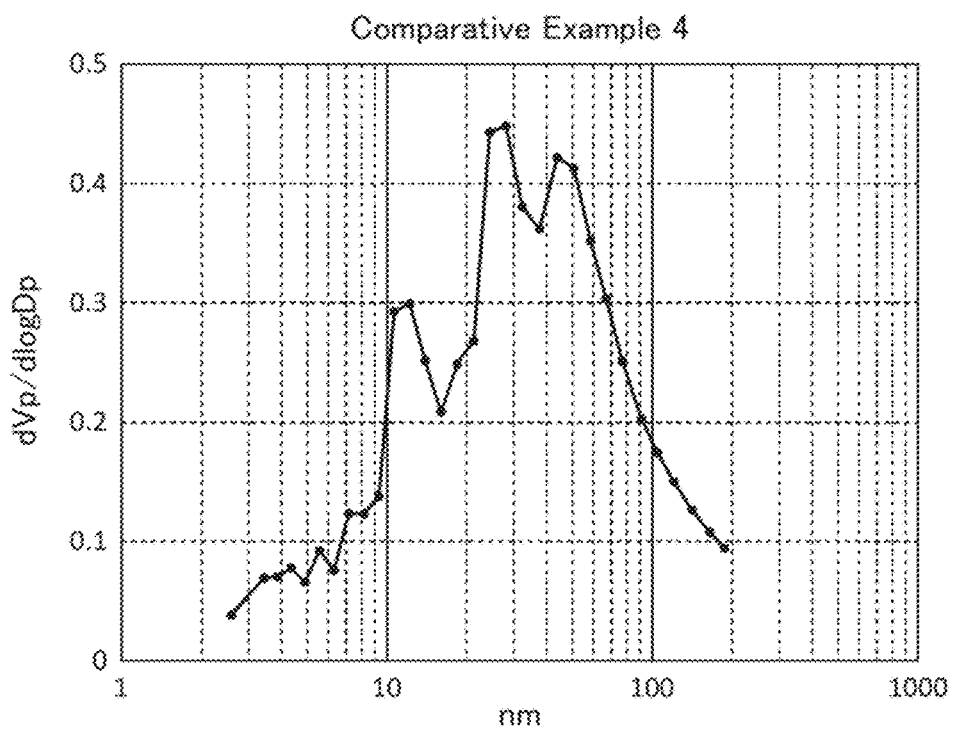
FIG. 19 is a graph showing the differential pore distribution of the powder of Comparative Example 4.

FIGS. 15 to 18 are SEM images showing the powder of Example 7, FIG. 16 is an enlarged image of FIG. 15, FIG. 17 is an enlarged image of FIG. 16, and FIG. 18 is an enlarged image of FIG. 17.

From the SEM images of FIGS. 3 to 18, it was confirmed that: the powders of Examples 3 and 7 and Comparative Examples 4 and 9 each included a granule that was an aggregate of metahalloysite including metahalloysite nanotubes; pores derived from tube holes of metahalloysite nanotubes (first pores) were present in the granule; and pores having a larger diameter than that of the tube holes of metahalloysite nanotubes (second pores) were present in the granule.

This was also true in the SEM images of the powders of other Examples and Comparative Examples (not illustrated).

<<Pore Distribution Measurement>>

The nitrogen adsorption-desorption isotherms of the powders of Examples 1 to 8 and Comparative Examples 1 to 10 were obtained. The measurement conditions are as described above.

FIGS. 19 to 22 are graphs showing the differential pore distributions determined from the nitrogen adsorption isotherms by the BJH method for the powders of Comparative Example 4, Example 3, Comparative Example 9, and Example 7, respectively. In each graph, the horizontal axis represents pore size (nm), and the vertical axis represents differential pore volume (dVp/dlogDp) (cm³/g).

In every graph, two or more pore size peaks were observed in the range from 10 to 100 nm.

were measured. The measurement methods are as described above. The results are shown in Table 2 below.

<<C Amount by Combustion Method>>

The powders of some of Examples and Comparative Examples were analyzed for determination of an amount of carbon by the combustion method (C amount determined by the combustion method). The analysis method is as described above. The results are shown in Table 2 below.

TABLE 2

| Table 2 | Nitrogen | | | | | Water Vapor | | | |
|---|---|---|---|---|---|---|---|---|---|
| | BJH total pore area [m²/g] | BJH total pore volume [cm³/g] | BET specific surface area [m²/g] | Total pore volume for calculation [cm³/g] | Average pore size [nm] | BET specific surface area [m²/g] | BET ratio | Average particle size [μm] | C amount by combustion method [mass %] |
| CE 1 | 91.8 | 0.37 | 72.2 | 0.36 | 19.8 | — | — | 4.3 | 0.19 |
| CE 2 | 96.1 | 0.39 | 81.4 | 0.38 | 18.7 | — | — | — | — |
| CE 3 | 96.1 | 0.37 | 82.6 | 0.36 | 17.5 | — | — | — | — |
| CE 4 | 94.0 | 0.41 | 76.5 | 0.40 | 21.1 | 49.3 | 0.64 | — | 0.04 |
| CE 5 | 91.4 | 0.37 | 73.0 | 0.36 | 19.8 | — | — | — | — |
| CE 6 | 55.8 | 0.28 | 41.4 | 0.27 | 26.3 | — | — | — | — |
| CE 7 | — | — | — | — | — | — | — | — | 0.97 |
| EX 1 | — | — | — | — | — | — | — | — | 0.64 |
| EX 2 | 90.0 | 0.36 | 71.5 | 0.35 | 19.4 | — | — | — | 0.61 |
| EX 3 | 87.6 | 0.36 | 71.4 | 0.35 | 19.6 | 37.1 | 0.52 | — | 0.57 |
| EX 4 | 88.6 | 0.35 | 70.4 | 0.34 | 19.5 | — | — | — | 0.48 |
| EX 5 | 16.2 | 0.10 | 13.2 | 0.10 | 30.8 | — | — | — | 0.30 |
| CE 8 | 97.3 | 0.33 | 82.5 | 0.32 | 15.7 | — | — | 31.9 | — |
| CE 9 | 94.8 | 0.33 | 79.1 | 0.32 | 16.0 | 45.9 | 0.58 | 31.6 | 0.04 |
| CE 10 | 97.1 | 0.35 | 77.4 | 0.34 | 17.6 | — | — | 30.8 | — |
| EX 6 | 94.7 | 0.34 | 74.7 | 0.33 | 17.5 | — | — | 33.1 | — |
| EX 7 | 92.1 | 0.32 | 73.6 | 0.31 | 17.0 | 36.1 | 0.49 | 31.9 | 0.51 |
| EX 8 | 90.9 | 0.34 | 72.2 | 0.33 | 18.5 | — | — | 32.0 | — |

CE: Comparative Example
EX: Example

This was also true in the graphs of the differential pore distributions of the powders of other Examples and Comparative Examples (not illustrated).

Along with the pore distribution measurement, the BJH total pore area, the BJH total pore volume, the BET specific surface area (BET specific surface area determined by the nitrogen adsorption method), the total pore volume for calculation, and the average pore size were determined for the powders of some of Examples and Comparative Examples. The results are shown in Table 2 below.

<<BET Specific Surface Area Determined by Water Vapor Adsorption Method>>

The water vapor adsorption-desorption isotherms of the powders of Examples 3 and 7 and Comparative Examples 4 and 9 were measured. The measurement conditions are as described above. Then, the BET specific surface areas (BET specific surface areas determined by the water vapor adsorption method) of the powders were obtained. The results are shown in Table 2 below.

<<Bet Ratio>>

From the BET specific surface areas determined by the nitrogen adsorption method and the BET specific surface areas determined by the water vapor adsorption method as described above, the ratios of the BET specific surface area determined by the water vapor adsorption method to the BET specific surface area determined by the nitrogen adsorption method (BET ratio) were obtained. The results are shown in Table 2 below.

<<Average Particle Size>>

The average particle sizes of granules constituting the powders of some of Examples and Comparative Examples

The invention claimed is:

1. Metahalloysite powder comprising a granule that is an aggregate of metahalloysite including a metahalloysite nanotube covered by elemental carbon, or metahalloysite powder comprising a granule that is an aggregate of metahalloysite including a metahalloysite nanotube that is tube-shaped metahalloysite, the metahalloysite including elemental carbon, wherein a differential pore distribution determined from a nitrogen adsorption isotherm by the BJH method exhibits two or more pore size peaks in a range from 10 to 100 nm, wherein a total pore area is not less than 12.0 m²/g, wherein an amount of carbon determined by a combustion method is not greater than 5.0 mass %, wherein the elemental carbon is generated by firing an organic surfactant in an inert atmosphere, and wherein an average particle size is not less than 1 μm.

2. The metahalloysite powder according to claim 1, wherein the granule includes a first pore derived from a tube hole of the metahalloysite nanotube, and a second pore different from the first pore.

3. The metahalloysite powder according to claim 1, wherein a ratio of a BET specific surface area determined by a water vapor adsorption method to a BET specific surface area determined by a nitrogen adsorption method (BET specific surface area determined by water vapor adsorption method/BET specific surface area determined by nitrogen adsorption method) is not greater than 0.55.

4. The metahalloysite powder according to claim 1, wherein an amount of carbon determined by a combustion method is not less than 0.1 mass %.

5. The metahalloysite powder according to claim 1, wherein an average particle size is from 1 to 200 μm.

6. The metahalloysite powder according to claim 1, wherein a BET specific surface area determined by a nitrogen adsorption method is not less than 10 m$^2$/g.

7. The metahalloysite powder according to claim 1, wherein an average pore size is not less than 11.0 nm.

* * * * *